(12) United States Patent
Kobayashi et al.

(10) Patent No.: US 6,203,154 B1
(45) Date of Patent: Mar. 20, 2001

(54) ELECTROCHROMIC ELEMENT

(75) Inventors: Masaaki Kobayashi; Izuru Sugiura; Yoshinori Nishikitani, all of Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/589,230

(22) Filed: Jun. 7, 2000

Related U.S. Application Data

(63) Continuation of application No. PCT/JP98/05737, filed on Dec. 18, 1998.

(30) Foreign Application Priority Data

Dec. 19, 1997 (JP) ................................................. 9-364867
Dec. 19, 1997 (JP) ................................................. 9-364868

(51) Int. Cl.$^7$ ......................................................... G02F 1/153
(52) U.S. Cl. ........................ 350/270; 359/265; 359/267; 359/268
(58) Field of Search ................................. 359/265, 267, 359/268, 270

(56) References Cited

U.S. PATENT DOCUMENTS

| | | | |
|---|---|---|---|
| 4,715,691 | * 12/1987 | Sata et al. ........................... | 359/267 |
| 4,902,108 | * 2/1990 | Byker .................................. | 359/265 |
| 5,068,062 | * 11/1991 | Inata et al. ......................... | 252/518 |
| 5,310,829 | * 5/1994 | Yamamoto et al. ................ | 525/540 |
| 5,859,722 | * 1/1999 | Suga et al. ......................... | 359/265 |
| 5,883,220 | * 3/1999 | Armand et al. .................... | 528/322 |
| 5,995,273 | * 11/1999 | Chandrasekhar .................. | 359/270 |
| 6,020,987 | * 2/2000 | Baumann et al. .................. | 359/273 |
| 6,023,364 | * 2/2000 | Kobayashi et al. ................ | 359/265 |

FOREIGN PATENT DOCUMENTS

| | | |
|---|---|---|
| 55-80483 | 6/1980 | (JP) . |
| 63-43124 | 2/1988 | (JP) . |
| 63-225688 | 9/1988 | (JP) . |
| 2-110187 | * 4/1990 | (JP) . |
| 3-241322 | 10/1991 | (JP) . |

* cited by examiner

*Primary Examiner*—Georgia Epps
*Assistant Examiner*—Evelyn A. Lester
(74) *Attorney, Agent, or Firm*—Akin, Gump, Strauss, Hawer & Feld, L.L.P.

(57) ABSTRACT

An electrochromic element composed of an electrochromic layer comprising a specified electrically conductive polymer and an ionically conductive substance layer containing a viologen compound, both sandwiched between two electrically conductive substrates at least one of which is transparent.

6 Claims, 1 Drawing Sheet

ELECTROCHROMIC ELEMENT

CROSS-REFERENCE TO RELATED APPLICATION

This application is a continuation of International Application PCT/JP98/05737 filed Dec. 18, 1998, the disclosure of which is incorporated herein by reference.

BACKGROUND OF THE INVENTION

1. Field of the Invention

This invention relates to electrochromic elements and more particularly electrochromic elements which are useful as light controllable windows for buildings, automobiles and passenger vehicles and various types of light controllable glasses to be used for indoor decoration or partitions; display devices; and anti-dazzle mirrors for automobiles and other vehicles.

2. Description of the Prior Art

A conventional electrochromic device such as a light controllable glass of conventional type as disclosed in Japanese Patent Laid-Open Publication No. 63-18336 is known which glass comprises a chromogenic material in the form of a film obtained by sputtering or vacuum-depositing an inorganic oxide such as tungsten oxide ($WO_3$) over a transparent electrically conductive film.

3. Problems to be solved

However, the conventional film formation techniques must be carried out under vacuum, resulting in increased production costs and a requirement of a large size vacuum apparatus if an electrochromic element of a large area is intended to be produced. Furthermore, since a substrate is heated at an elevated temperature during sputtering, it is necessary to select certain conditions if a substrate other than a glass, such as synthetic resin-made substrate is used, resulting in difficulties in lightening an electrochromic element.

There is also a problem that tungsten oxide can only make an electrochromic element exhibit blue color.

SUMMARY OF THE INVENTION

An object of the present invention is to provide an electrochromic element which can be manufactured using an inexpensive color developing material with easy operations and can easily be changed in color tone.

An electrochromic device proposed by the present invention solves the above-mentioned problems of the prior art by forming an electrochromic layer from a specific type of electrically conductive polymeric compound and presenting an electrochromic compound in an ion conductive material layer as well.

Namely, according to the present invention, there is provided an electrochromic element comprising two conductive substrates, at least one of which is transparent; an ion conductive layer disposed therebetween and containing a compound having a viologen structure represented by formula (1) below; and an electrochromic layer disposed between the ion conductive layer and at least either one of the two conductive substrates and containing a compound represented by formula (2) or (3) below; formula (1) being represented by

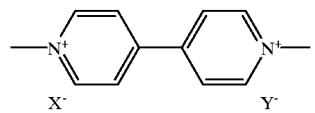

wherein $X^-$ and $Y^-$ may be the same or different and each are a counter anion selected from the group consisting of a halogen anion, $ClO_4^-$, $BF_4^-$, $PF_6^-$, $CH_3COO^-$ and $CH_3(C_6H_4)SO_3^-$;

formula (2) being represented by

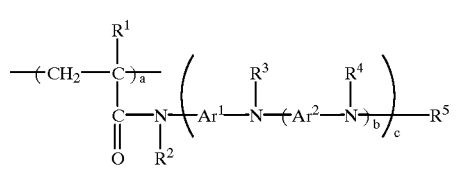

wherein $R^1$ is hydrogen or an alkyl group having 1 to 5 carbon atoms, $R^2$, $R^3$, $R^4$ and $R^5$ are each independently a hydrocarbon group or hydrocarbon residue having 1 to 20 carbon atoms and may be the same or different from each other, $Ar^1$ and $Ar^2$ are each independently a divalent aromatic hydrocarbon residue having 6 to 20 carbon atoms, a is an integer of greater than 2 and b and c are each an integer of 0 to 3; and formula (3) being represented by

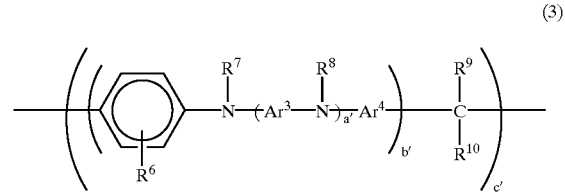

wherein $R^6$, $R^7$, $R^8$, $R^9$ and $R^{10}$ are each independently hydrogen or a hydrocarbon group residue having 1 to 20 carbon atoms, $Ar^4$ and $Ar^5$ are each independently a divalent aromatic hydrocarbon residue, a' is an integer of 0 to 3, b' is an integer of 1 or 2 and c' is an integer greater than 2.

DETAILED DESCRIPTION OF THE INVENTION

Two electrically conductive substrates, at least one of which is transparent, are used in the present invention. The conductive substrates may be any type of substrates as long as they have a function as an electrode. More specifically, the conductive substrate may be entirely formed from an electrically conductive material or formed with a non-electrically conductive substrate and an electrode layer disposed thereon. Regardless of whether a substrate is electrically conductive or not, it necessarily has a smooth surface at normal temperature but may have a flat or curved surface and may be deformable under stress.

At least of one of the two electrically conductive substrates is a transparent electrically conductive substrate and the other may be a transparent or opaque or reflective electrically conductive substrate.

Two conductive substrates both of which are transparent are suitable for a display device and a light controllable glass. A combination of a transparent conductive substrate and an opaque conductive substrate is suitable for a display device, while a combination of a transparent conductive substrate and a reflective substrate is suitable for an electrochromic mirror.

The transparent conductive substrate is generally formed by laminating a transparent electrode layer over a transparent substrate. The term "transparency" used herein designates an optical transmission ranging from 10 to 100 percent.

The opaque conductive substrate is may be a laminate obtained by laminating an electrode layer over one surface of a metal plate or a non-conductive opaque substrate such as various opaque plastics, ceramics, glasses, woods and stones.

The reflective electrically conductive substrate may be exemplified by (1) a laminate comprising a non-conductive transparent or opaque substrate and a reflective electrode layer formed thereon, (2) a laminate comprising a no-conductive transparent substrate having a transparent electrode layer on one of its surfaces and a reflective electrode layer on the other surface, (3) a laminate comprising a non-conductive transparent substrate having a reflective layer formed thereon and further a transparent electrode layer formed thereon, (4) a laminate comprising a reflective substrate and a transparent electrode layer formed thereon and (5) a plate-like substrate which itself functions as a reflective layer and an electrode.

No particular limitations is imposed on the transparent substrate which may thus be a color or colorless glass, a reinforced glass and a resin of color or colorless transparency. Specific examples of such a resin include polyethylene terephthalate, polyamide, polysulfone, polyether sulfone, polyether etherketone, polyphenylene sulfide, polycarbonate, polyimide, polymethyl methacrylate and polystyrene. The substrates used in the present invention must have a smooth surface at normal temperature.

There is no particular restriction to the transparent electrode layer as long as it meets the requirements for achieving the purpose of the present invention. Specific examples of the electrode layer include electrically conductive film such as thin films of metals such as gold, silver, chrome, copper and tungsten or metal oxides such as ITO ($In_2O_3$—$SnO_2$), tin oxide, silver oxide, zinc oxide and vanadium oxide.

The electrode has a film thickness in the range of usually 100 to 5,000 and preferably 500 to 3,000 angstrom. The surface resistance of the electrode is usually in the range of 0.5–500 and preferably 1–50 $\Omega$/sq.

No particular limitation is imposed on a method of forming the electrode layer. Any suitable conventional methods may be employed, depending upon the metal and metal oxide constituting the electrode. In general, the formation of the electrode layer is carried out by vacuum evaporation, ion plating, sputtering and a sol-gel method. The thickness of the electrode layer is selected within the range such that the transparency thereof is not affected. The electrode layer may be partially provided with an opaque electrode-activator for the purpose of imparting oxidation-reduction capability, electric conductivity and electric double layer capacitance, the electrode-activator being provided in an amount such that the transparency of the entire electrode layer is not harmed. Electrode activators eligible for the purpose of the invention are a metal such as copper, silver, gold, platinum, iron, tungsten, titanium and lithium, an organic material having oxidation-reduction capability such as polyaniline, polythiophen, polypyrrole and phthalocyanine, a carbon material such as active carbon and graphite and a metal oxide such as $V_2O_5$, $MnO_2$, NiO and $Ir_2O_3$ and mixtures thereof. A variety of resins may be used for integrating the electrode activator in the electrode. The opaque electrode activator may applied onto an electrode by forming on an ITO transparent electrode a composition comprising an active carbon fiber, graphite and an acrylic resin into a micro pattern in the shape of stripes or by forming on a thin-film of gold a composition comprising $V_2O_5$, acetylene black and butyl rubber in the shape of a mesh.

No particular limitation is imposed on the reflective electrode layer as long as it is stable electrochemically and has a specular surface. Eligible for the reflective electrode layer includes the films of metal such as gold, platinum, tungsten, tantalum, rhenium, osmium, iridium, silver, nickel and palladium and the film of an alloy such as platinum-palladium, platinum-rhodium and stainless steel. The reflective electrode layer is necessarily disposed onto a substrate or a transparent substrate with the reflectiveness and specularity of the layer maintained. The reflective electrode layer is formed onto a substrate by any suitable conventional method such as vacuum deposition, ion-plating and sputtering.

No particular limitation is imposed on a substrate on which the reflective electrode layer is disposed. The substrate may be transparent or opaque. Specific examples of the substrate include those as exemplified with respect to the transparent substrate described above, a variety of plastics, resins, glasses, woods and stones.

No particular limitation is imposed on materials for the above-mentioned reflective plate or layer as long as it can provide a specular surface. For example, Silver, chrome, aluminum and stainless steel are eligible.

The plate-like substrate having a reflective layer and functioning as an electrode may be exemplified by the substrates exemplified with respect to the reflective electrode among which are self-supportive.

Next, an electrochromic layer used in the present invention is described.

The electrochromic layer of the present invention contains the following conductive polymer A or B.

Conductive Polymer A

This compound is represented by the formula

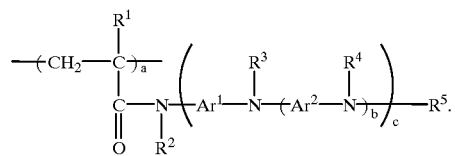

(2)

In formula (2), $R^1$ is hydrogen or a $C_1$–$C_5$ alkyl group. Specific examples of the alkyl group are methyl, ethyl, i-propyl, n-propyl, n-butyl, t-butyl, t-butyl and n-pentyl groups. $R^1$ is preferably hydrogen or a methyl group.

$R^2$, $R^3$, $R^4$ and $R^5$ are each independently hydrogen or a $C_1$–$C_{20}$, preferably $C_1$–$C_{10}$ hydrocarbon group or hydrocarbon residue and may be the same or different. The hydrocarbon group may be an alkyl group such as methyl, ethyl, n-propyl, i-propyl, n-butyl, i-butyl, t-butyl, hexyl, heptyl and octyl groups, an alkylphenyl group such as tolyl and ethylphenyl groups, an aryl group such as phneyl gorup, an alkylaryl group and an aralkyl group. The hydrocarbon residue may be an alkoxyphenyl group such as methoxyphneyl and ethoxyphenyl groups.

$Ar^1$ and $Ar^2$ are each independently a divalent aromatic hydrocarbon group. Specific examples of such a divalent aromatic hydrocarbon group are o-, m- or p-phenylene groups, substituted phenylene groups of which substituent is the same as defined with respect to $R^6$, such as alkyl-substituted phenylene groups, and biphenylene groups.

The letter "a" is an integer of greater than 2, usually an integer of 2 to 500, preferably 5 to 200, while b and c are each an integer of 0 to 3.

The compound of formula (2) can be easily obtained by polymerizing a compound represented by the formula

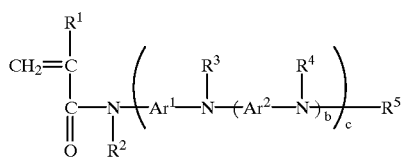

(4)

wherein $R^1$, $R^2$, $R^3$, $R^4$, $R^5$, $Ar^1$, $Ar^2$, b and c are those as defined in formula (2).

The compound of formula (4) can be easily obtained by reacting an amine compound of formula (5) with a reactive acid chloride of formula (6)

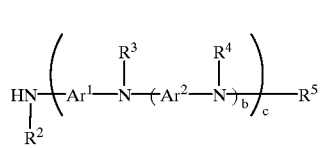

(5)

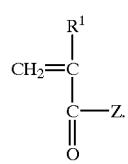

(6)

In formula (5), $R^1$, $R^2$, $R^3$, $R^4$, $Ar^1$, $Ar^2$, b and c are those as defined in formula (4). In formula (6), Z indicates a halogen atoms such as fluorine, chlorine, bromine and iodine.

The compound of formula (4) is exemplified by phenylenediamine, N-methylphenylenediamine, N,N'-dimethylphenylenediamine, N,N,N'-trimethylphenylenediamine, N-ethylphenylenediamine, N,N'-diethylphenylenediamine, N,N,N'-triethylphenylenediamine, N-phenylphenylenediamine, N,N'-diphenylphenylenediamine, N,N,N'-tripehylpehnylenediamine, N-tolylphenylenediamine, N,N'-triphenylenediamine, N,N,N'-tritolylphenylenediamine, N-(4-aminophenyl)-N' -phenylphenylenediamine, N-(4-aminophenyl)-N,N'-diphenylphenylenediamine, N-(4-aminophenyl)-N,N,N'-triphenylphenylenediamine, N-(4-aminophenyl)-N',N'-diphenylphenylenediamine, N-(4-aminophenyl)-N-tolylphenyphenylenediamine, N-(4-aminophenyl)-N-phenyl-N'-tolylphenylenediamine, N-(4-aminophenyl)-N-tolyl-N'-phenylphenylenediamine, N-(4-aminophenyl)-N,N'-ditolylphenylenediamine, N-(4-aminophenyl)-N',N'-ditolylphenylenediamine, N-(4-aminophenyl)-N-phenyl-N',N'-ditolylphenylediamine, N-(4-aminophenyl)-N,N'-diphenyl-N'-tolylphenylenediamine, N-(4-aminophenyl)-N,N',N'-tritolylphenylenediamine, N-(4-aminophenyl)-N-methylphenylenediamine, N-(4-aminophenyl)-N -phenyl-N'-methylphenylenediamine, N-(4-aminophenyl)-N-methyl-N'-phenylphenylenediamine, N-(4-aminophenyl)-N, N'-dimethylphenylenediamine, N-(4-aminophenyl)-N',N'-dimethylphenylenediamine, N-(4-aminophenyl)-N-phenyl-N',N'-dimethylphenylenediamine, N-(4-aminophenyl)-N,N'-diphenyl-N'-methylphenylenediamine, N-(4-aminophenyl)-N,N',N'-trimethylphenylenediamine, benzidine, N-methylbenzidine, N,N'-dimethylbenzidine, N,N,N'-trimethylbenzidine, N-ethylbenzidine, N,N'diethylbenzidine, N,N,N'-triethylbenzidine, N-phenylbenzidine, N,N'-diphenylbenzidine, N,N,N'-triphenylbenzidine, N-tolylbenzidine, N,N'-tolylbenzidine, N,N,N'-tritolylbenzidine, N-(4-aminophenyl)-N'-phenylbenzidine, N-(4-aminophenyl)-N,N'-diphenylbenzidine, N-(4-aminophenyl)-N,N',N'-triphenylbenzidine, N-(4-aminophenyl)-N',N'-diphenylbenzidine, N-(4-aminophenyl)-N-tolylbenzidine, N-(4-aminophenyl)-N-phenyl-N'-tolylbenzidine, N-(4-aminophenyl)-N -tolyl-N'-phenylbenzidine, N-(4-aminophenyl)-N ,N'-ditolylbenzidine, N-(4-aminophenyl)-N',N'-ditolylbenzidine, N-(4-aminophenyl)-N-phenyl-N',N'-ditolylbenzidine, N-(4-aminophenyl)-N,N'-diphenyl-N'-tolylbenzidine, N-(4-aminophenyl)-N,N',N'-tritolylbenzidine, N-(4-aminophenyl)-N-methylbenzidine, N-(4-aminophenyl)-N-phenyl-N'-methylbenzidine, N-(4-aminophenyl)-N-methyl-N'-phenylbenzidine, N-(4-aminophenyl)-N,N'-dimethylbenzidine, N-(4-aminophenyl)-N',N'-dimethylbenzidine, N-(4-aminophenyl)-N-phenyl-N',N'-dimethylbenzidine, N-(4-aminophenyl)-N,N'-diphenyl-N'-dimethylbenzidine and N-(4-aminophenyl)-N,N',N' -trimethylbenzidine.

The compound of formula (5) may be acrylic chloride or methacrylic chloride.

Conductive polymer B

Conductive polymer B is represented by the formula

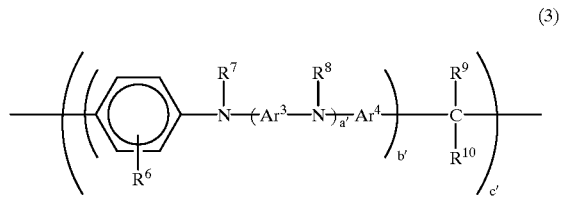

(3)

In formula (3), $R^6$, $R^7$, $R^8$, $R^9$ and $R^{10}$ are each independently hydrogen or a $C_1$–$C_2$, preferably $C_1$–$C_{12}$ hydrocarbon residue.

More specifically, preferred for $R^6$, $R^7$ and $R^8$ are an alkyl group such as methyl, ethyl, n-propyl, i-propyl, n-butyl, i-butyl and n-hexyl, an alkoxyphenyl group such as methoxyphneyl and ethoxyphneyl, an alkylphenyl group such as tolyl and ethylphenyl, an aryl group such as phenyl, a hydrocarbon residue such as an aralkyl group and derivatives thereof and hydrogen. Preferred for $R^9$ and $R^{10}$ are an alkyl group such as methyl, ethyl, n-propyl, i-propyl, n-butyl, i-butyl and n-hexyl, an alkoxyphenyl group such as methoxyphneyl and ethoxyphneyl, an alkylphenyl group such as tolyl and ethylphenyl, an aryl group such as phenyl, chlorophenyl and nitrophenyl, a hydrocarbon residue such as an aralkyl group, derivatives thereof, a furyl group and pyridyl group and hydrogen.

In formula (3), $Ar^3$ and $Ar^4$ are each independently a $C_6$–$C_{18}$ divalent aromatic hydrocarbon residue.

Ar³ may be the following divalent hydrocarbon residue:

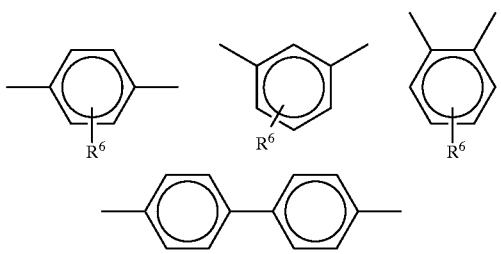

wherein R⁶ is the same as that of formula (3).

Specific examples of such hydrocarbon residues are various phenylene groups such as p-phenylene, m-phenylene, p-biphenylene, methyl-p-phenylene, ethyl-p-phenylene, methoxy-p-phenylene, methyl-m-phenylene, ethyl-m-phenylene and methoxy-m-phneylene and derivatives thereof.

Ar² may be the above-described phenylene groups and derivatives thereof and a divalent monocyclic or condensed polycyclic aromatic hydrocarbon residue such as 1,5- or 2,7-naphtylene, 1,4-, 1,5- or 2,6-anthraquinonylene, 2,4- or 2,7-fluorenonylene, byrenylene, 2,7-phenanethraquinonylene, 2,7-(9-dicyanomethylene) fluorenonylene, dibenzotrobonzyl, dicyanomethylenedibenzotrobonzyl and benzanthronylene groups; and a divalent hetero atom-containing condensed heterocyclic aromatic hydrocarbon residue such as divalent heterocyclic groups exemplified by 2-phenylbenzooxazolexzyl, 2-phenylbenzimidazolezyl, carbazolezyl, 2-phenylbenzotriazolezyl, dibenzothiophenezyl, dibenzothiophenoxidezyl, 9-acridonzyl, xanthonezyl and phenoxanezyl groups.

In formula (3), a' is an integer of greater than 0, usually 0 to 50, preferably 0 to 10, more preferably 0 to 5, m is an integer of greater than 1, usually 1 to 50, preferably 1 to 30, n is an integer of greater than 2, usually 2 to 1,000, preferably 5 to 200. Therefore, formula (3) represents a compound having a linear structure. No particular limitation is imposed on the terminal ends of formula (3). However, they are preferably hydrogen.

The compound of formula (3) is produced by polycondensation of a compound of formula (7) and a compound of formula (8) or a polymer thereof but may be produced by any suitable method:

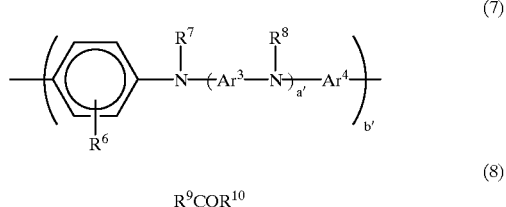

R⁹COR¹⁰ (8)

wherein R⁶, R⁷, R⁸, R⁹, R¹⁰, a' and b' are the same as defined in formula (3).

A compound of formula (7) is exemplified by N,N'-diphenyl-p-phenylenediamine compounds and N-phenyl-N'-(4-phenylamino)phenyl-p-phenylenediamine compounds.

Typical examples of the N,N'-diphenyl-p-phenylenediamine compounds are N,N'-dimethyl-N,N'-diphenyl-p-phenylenediamine, N,N'-diethyl-N,N'-diphenyl-p-phenylenediamine and N,N'-dipropyl-N,N'-diphenyl-p-phenylenediamine.

A compound of formula (8) is exemplified by various carbonyl compounds such as aldehyde, polymers thereof and ketones.

Typical examples of aldehyde are formaldehyde, acetaldehyde, propionealdehyde, butylaldehyde, benzaldehyde, acylaldehyde, cinnamic aldehyde, anisaldehyde, nicotinealdehyde, nitrobenzaldehyde, chlorobenzaldehyde and furfural.

The above-mentioned polymers of aldehyde are polymers which can be obtained by self-condensation of a dense solution of aldehyde of formula (8) or condensation of aldehyde of formula (8) in the presence of an acid catalyst and is easily hydrolyzed under the conditions in which a copolymer, i.e. a compound of formula (3) is synthesized, thereby forming a aldehyde monomer. Typical examples of such polymers are paraformaldehyde which is a polymer of formaldehyde, and paraaldehyde which is a trimer of acetaldehyde.

Specific examples of ketones are acetone, methylethylketone, diethylketone and cyclohexylacetone.

The polycondensation of a compound of formula (1) with a compound of formula (8) can be carried out in an organic solvent in which both of the compounds are soluble, at a temperature of 0 to 200° C. using an acid or alkali catalyst. Examples of the acid catalyst are an inorganic acid such as sulfuric acid, hydrochloric acid, phosphoric acid, perchloric acid and diphosphorus pentoxide and an organic acid such as formic acid, acetic acid, propionic acid, methansulfonic acid and p-toluenesulfonic acid.

These acid catalysts may be used singlely or in combination. Preferred organic solvents are ethers such as ethylether, tetrahydrofurane and dioxane, halogenated hydrocarbons such as chloroform, dichloromethane and chlorobenzene, nitro compounds such as nitrobenzene, acetnitrile, propionecarbonate, dimethylformamide and N-methylpyrrolidone.

The reaction may be continued for from 1 minute to 500 hours, preferably from 5 minutes to 200 hours.

The electrochromic layer of the present invention contains necessarily the above-described conductive polymers A and/or B and typically is composed of only these conductive polymers. The formation of the electrochromic layer is conducted by any suitable method. For example, the electrochromic layer is formed by dissolving conductive polymers A and/or B in a solvent and applying the solution over the above-mentioned conductive substrate, followed by drying. Alternatively, it is also capable to employ a method in which conductive polymers A and/or B are melted by heating and then cast over the above-described conductive substrate, followed by cooling. The former method is preferred.

The solvent used in the former method may be any type of solvent which can dissolve conductive polymers A and or B and vaporize after being applied over the substrate, such as dimethylsulfoxide, dimethylacetamide, dimethylformamide, N-methylpyrrolidone, γ-valerolactone, dimethoxyethane, acetnitrile, propionenitrile, tetrahydrofurane, dioxane, methanol, ethanol, propanol, chloroform, toluene, benzene, nitrobenzene and dioxorane.

The application of the solvent may be conducted by cast-coating, spin-coating or dip-coating. The formed layer is dried by any suitable method.

The thickness of the electrochromic layer is usually 0.01 to 50 μm, preferably 0.1 to 20 μm.

Accordingly, there can be obtained an electrochromic layer which can be readily reduced and oxidized by application of an electric voltage and thus can be colored or decolored. If necessary, conductive polymers A and/or B may be dipped with known compounds which facilitate coloration.

The ion conductive material layer contained in the inventive electrochromic element is a layer which plays a role of coloring, decoloring or discoloring the above-described electrochromic layer. The ion conductive layer is composed of a material having an ion conductivity of more than $1\times10^{-7}$ S/cm at room temperature. Although the electrochromic element according to the present invention is characterized in that the ion conductive material layer contains a compound having a viologen structure, the ion conductive material is described before describing the compound having a viologen structure.

No particular limitation is imposed on the ion conductive material, which may thus be liquid, gel or solid. Solid ion conductive materials are particularly preferred for the purpose of the invention so as to be able to obtain an electrochromic mirror which is overall solid and excelled in various performances for practical usage.

Liquid Ion Conductive Material

Eligible liquid ion conductive materials are those dissolving a supporting electrolyte such as salts, acids and alkalis in a solvent.

Although any suitable solvents may be used as long as they can dissolve a supporting electrolyte, preferred are those having polarity. Specific example of such solvents are water and an organic polar solvent such as methanol, ethanol, propylene carbonate, ethylene carbonate, dimethylsulfoxide, dimethoxyethane, acetonitrile, γ-butyrolactone, γ-valerolactone, sulforan, dimethylformamide, dimethoxyethane, tetrahydrofuran, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, γ-butyrolactone, sulforan, dioxolane, dimethylformamide, tetrahydrofuran, adiponitrile, methoxyacetonitrile, dimethylacetoamide, methylpyrrolidinone, dimethylsulfoxide, trimethylphosphate and polyethylene glycol. These may be used singlely or in combination.

Although not restricted, salts used as a supporting electrolyte may be alkali metal salts, inorganic ion salts such as alkaline earth metal salts, quaternary ammonium salts and cyclic quaternary ammonium salts. Specific examples of such salts include alkali metal salts of lithium, sodium or potassium such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$, quaternary ammonium salts or cyclic quaternary ammonium salts such as $(CH_3)_4NBF_4$, $(C_2H_5)_4NBF_4$, $(n-C_4H_9)_4NBF_4$, $(C_2H_5)_4NBr$, $(C_2H_5)_4NClO_4$ and $(n-C_4H_9)_4NClO_4$ and mixtures thereof.

Acids used as a supporting electrolyte may be exemplified by inorganic acids and organic acids, specific examples of which include sulfuric acid, hydrochloric acid, phosphoric acid, sulfonic acid carboxylic acid.

Alkalis used as a supporting electrolyte include sodium hydroxide, potassium hydroxide and lithium hydroxide.

Gelatinized-Liquid Ion Conductive Material

The gelatinized-liquid ion conductive material may be those which are gelatinized or made to be viscous by adding a polymer or a gelatinizer to the above-mentioned liquid ion conductive material.

No particular limitation is imposed on the polymers, which thus may be polyacrylonitrile, carboxymethylcellulose, polyvinyl chloride, polyethylene oxide, polyurethane, polyacrylate, polyamide, polyacrylamide, cellulose, polyester, polypropyleneoxide and nafion.

Preferred examples of the gelatinizers are oxyethylenemethacrylate, oxyethyleneacrylate, urethaneacrylate, acrylamide and agar—agar.

Solid Ion Conductive Material

No particular limitation is imposed on the solid ion conductive material as long as it is solid at room temperature and ion conductive. Preferred examples of such solid ion conductive materials are polyethyleneoxide, the polymer of oxyethylenemethacrylate, nafion, polystyrene sulfonate, $Li_3N$, $Na-\beta-Al_2O_3$ and $Sn(HPO_4)_2H_2O$. Particularly preferred are polymer solid electrolytes obtained by polymerizing a polyethyleneoxide-based compound, an oxyalkyleneacrylate-based compound or a urethaneacrylate-based compound.

First examples of such polymer solid electrolytes are those obtained by solidifying a composition (hereinafter referred to as Composition A) containing the above-described organic polar solvent and supporting electrolyte and a urethaneacrylate of the formula

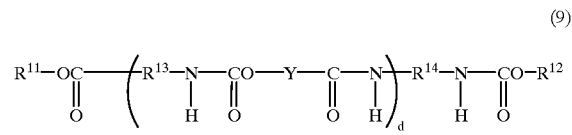

(9)

wherein $R^{11}$ and $R^{12}$ may be the same or different and are each a group of formula (4), (5) or (6) below, $R^{13}$ and $R^{14}$ may be the same or different and are each a $C_1$–$C_{20}$, preferably $C_2$–$C_{12}$ divalent hydrocarbon residue, Y is selected from a polyether unit, a polyester unit, a polycarbonate unit and the mixed unit thereof and n is an integer from 1 to 100, preferably 1 to 50 and more preferably 1 to 20.

Formulae (10), (11) and (12) are represented by

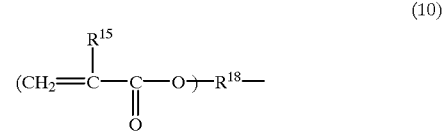

(10)

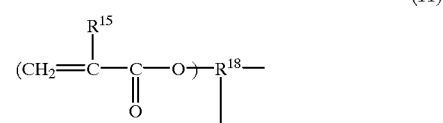

(11)

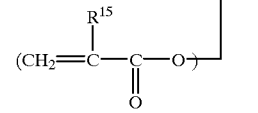

-continued (12)

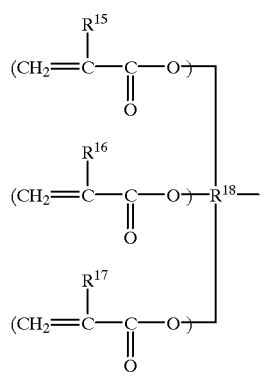

wherein $R^{15}$, $R^{16}$ and $R^{17}$ may be the same or different and are each a hydrogen atom or a $C_1$–$C_3$ alkyl group and $R^{18}$ is a $C_1$–$C_{20}$, preferably $C_2$–$C_8$ organic residue of divalent through quaternvalent.

Specific examples of such organic residues are a hydrocarbon residue such as alkyltolyl, alkyltetratolyl and alkylene of the formula (13)

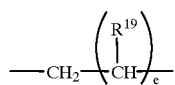

wherein $R^{19}$ is a $C_1$–$C_3$ alkyl group or hydrogen, p is an integer from 0 to 6 and if p is greater than 2 the groups of $R^{19}$ may be the same or different.

The hydrocarbon residue may be a group part of which hydrogen atoms are substituted by an oxygen-containing hydrocarbon group such as a $C_1$–$C_6$, preferably $C_1$–$C_3$ alkoxy group and a $C_6$–$C_{12}$ aryloxy group.

Specific examples of group $R^{18}$ in formulae (10) thorough (12) are those represented by the following formulae

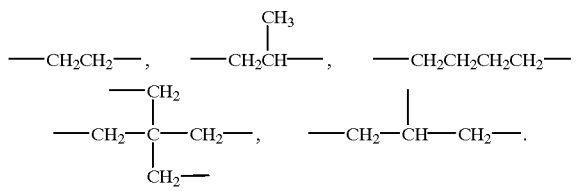

Each of the divalent hydrocarbon residues represented by $R^{13}$ and $R^{14}$ in formula (9) is exemplified by a divalent chain-like hydrocarbon group, an aromatic hydrocarbon group and an alicyclic-containing hydrocarbon group. Specific examples of the chain-like divalent hydrocarbon group are those represented by formula (13) above.

Specific examples of the aromatic hydrocarbon group and alicyclic-containing hydrocarbon group are those represented by the following formulae (14)

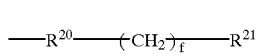

(15)

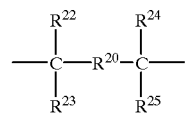

(16)

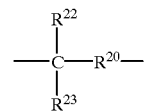

wherein $R^{20}$ and $R^{21}$ may be the same or different and each are a phenylene group, a phenylene group having an alkyl subsutituent, a cycloalkylene group and a cycloalkylene group having an alkyl substituent, $R^{22}$, $R^{23}$, $R^{24}$ and $R^{25}$ may be the same or different and each are a hydrogen atom or a $C_1$–$C_3$ alkyl group and q is an integer from 1 to 5.

Specific examples of the groups $R^{13}$ and $R^{14}$ in formula (9) are those represented by the following formulae (17)

—$CH_2CH_2CH_2CH_2CH_2CH_2$—

(18)

(19)

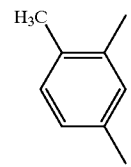

(20)

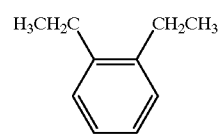

(21)

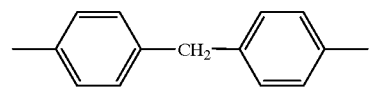

(22)

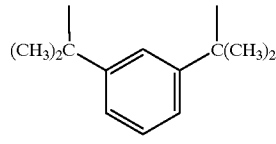

(23)

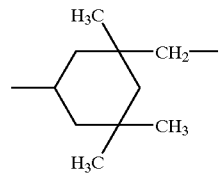

In formula (9), "Y" indicates a polyether unit, a polyester unit, a polycarbonate unit and mixed unit thereof. Each of these units is represented by the following formulae

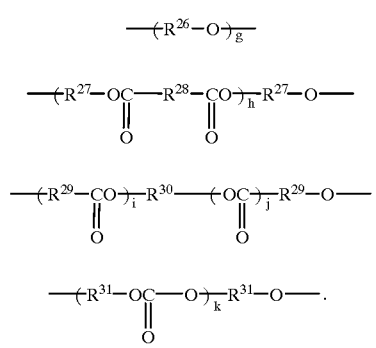

(a)
(b)
(c)
(d)

In formulae (a) through (d), $R^{26}$ through $R^{31}$ may be the same or different and are each a $C_1$–$C_{20}$, preferably $C_2$ $C_{12}$ divalent hydrocarbon residue. The letter "h" in formula (a) is an integer from 2 to 300, preferably 10 to 200, the letter "g" is an integer from 1 to 300, preferably 2 to 200, the letter "i" is an integer from 1 to 200, preferably 2 to 100, the letter "j" is an integer from 1 to 200, preferably 2 to 100 and the letter "k" is an integer from 1 to 300, preferably 10 to 200. Preferred for $R^{26}$ through $R^{31}$ are straight or branched alkylene groups among which methylene, ethylene, trimethylene, tetramethylene, pentamethylene, hexamethylene and propylene groups are preferred for $R^{28}$, and ethylene and propylene groups are preferred for $R^{26}$, $R^{27}$ and $R^{29}$ through $R^{31}$.

Each unit represented by formulae (a) through (d) may be a copolymer of the same or different units.

Urethaneacrylate of formula (9) has a molecular weight in the range from 2,500 to 30,000, preferably 3,000 to 20,000. The urethaneacrylate has preferably 2–6, more preferably 2–4 polymerization functional groups per molecule.

The urethaneacrylate may be prepared by any suitable conventional method.

An organic polar solvent (organic nonaqueous solvent) is added in an amount of 100–200, preferably 200–900 weight parts per 100 parts of the urethaneacrylate. The addition of the organic polar solvent in a too less amount would result in insufficient ion conductivity, while the addition of the organic polar solvent in a too much amount would cause reduced mechanical strength.

No particular limitation is imposed on the supporting electrolyte as long as it is not obstructive in achievement of the purpose of the invention. Preferred are those already exemplified above. The supporting electrolyte should be added in an amount of 0.1 to 30, preferably 1 to 20 weight percent of the organic polar solvent.

Composition (A) is obtained by solidifying the above-described essential components, namely, urethaneacrylate, organic nonaqueous solvent and supporting electrolyte. If necessary, any suitable optional components may be added to Composition (A) as long as they are not obstructive to the achievement of the purpose of the invention. Such components may be crosslinkers and photo- or thermal polymerization initiators.

Second examples of the polymeric solid electrolyte are polymeric solid electrolytes obtained by solidifying a composition (hereinafter referred to as Composition (B)) comprising an organic polar solvent, a supporting electrolyte, a monofunctional acryloyle-modified polyalkylene oxide of formula (24) below and a polyfunctional acryloyle-modified polyalkylene oxide of formula (25) or (26) below.

Formula (24) is represented by the formula

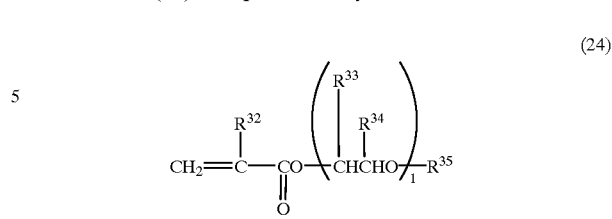

(24)

wherein $R^{32}$, $R^{33}$, $R^{34}$ and $R^{35}$ may be the same or different and are each hydrogen and an alkyl group having from 1 to 5 carbon atoms and n is an integer of greater than 1. Specific examples of the alkyl group include methyl, ethyl, i-propyl, n-propyl, n-butyl, t-butyl and n-pentyl. Preferred for $R^{32}$, $R^{33}$ and $R^{34}$ are hydrogen and a methyl group. Preferred for $R^{35}$ are hydrogen and methyl and ethyl groups.

The letter "l" in formula (24) is an integer of greater than 1, usually from 1 to 100, preferably from 2 to 50 and more preferably from 2 to 30.

Specific examples of compounds represented by formula (24) are those having 1–100, preferably 2–50 and more preferably 1–20 oxyalkylene units, such as methoxypolyethylene glycol methacrylate, methoxypolypropylene glycol methacrylate, ethoxypolyethylene glycol methacrylate, ethoxypolypropylene glycol methacrylate, methoxypolyethylene glycol acrylate, methoxypolypropylene glycol acrylate, ethoxypolyethylene glycol acrylate, ethoxypolypropylene glycol acrylate and mixtures thereof.

If "l" is greater than 2, the compound may be those having different oxyalkylene units, that is, copolymerized oxyalkylene units which for instance have 1–50, preferably 1–20 oxyethylene units and 1–50, preferably 1–20 oxypropylene units. Specific examples of such compounds are (ethylene propylene) glycol methacrylate, ethoxypoly (ethylene•propylene) glycol methacrylate, methoxypoly (ethylene•propylene) glycol methacrylate, methoxypoly (ethylene•propylene) glycol acrylate, ethoxypoly methoxypoly (ethylene•propylene) glycol acrylate and mixtures thereof.

The polyfunctional acryloyl-modified polyalkylene oxide may be a bifunctional acryloyl-modified polyalkylene oxide represented by the formula

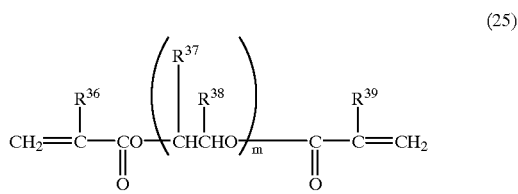

(25)

wherein $R^{36}$, $R^{37}$, $R^{38}$ and $R^{39}$ are each hydrogen and a $C_1$–$C_5$ alkyl group and m is an integer of greater than 1; or a polyfunctional acryloyl-modified polyalkylene oxide having more than three functional groups represented by the formula

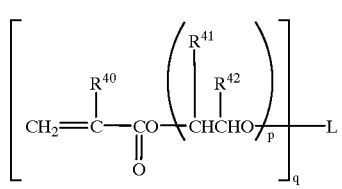

(26)

wherein $R^{40}$, $R^{41}$ and $R^{42}$ are each hydrogen and a $C_1$–$C_5$ alkyl group, p is an integer of greater than 1, q is an integer from 2 to 4 and L is a connecting group of valence indicated by q.

In formula (25), $R^{26}$, $R^{27}$, $R^{28}$ and $R^{29}$ are each hydrogen or a $C_1$–$C_5$ alkyl group, such as methyl, ethyl, i-propyl, n-propyl, n-butyl, t-butyl, t-butyl and n-pentyl among which preferred are hydrogen and particularly preferred is methyl.

The letter "m" in formula (25) is an integer of greater than 1, usually from 1 to 100, preferably from 2 to 50, more preferably from 2 to 30.

Preferred examples of compounds of formula (25) are those having 1–100, preferably 2–50, more preferably 1–20 oxyalkylene units such as polyethylene glycol diacrylate, polypropylene glycol dimethacrylate, polyethylene glycol diacrylate, polypropylene glycol dimethacrylate and mixtures thereof.

If m is greater than 2, the compounds of formula (25) may be those having different oxyalkylene units, that is, polymerized oxyalkylene unit having 1–50, preferably 1–20 oxyethylene units and 1–50, preferably 1–20 oxypropylene units, such as poly(ethylene•propylene)glycol dimethacrylate, poly(ethylene•propylene)glycol diacrylate and mixtures thereof .

In formula (26), $R^{40}$, $R^4$ and $R^{42}$ are each hydrogen or a $C_1$–$C_5$ alkyl group, such as methyl, ethyl, i-propyl, n-propyl, n-butyl, t-butyl and n-pentyl. Particularly preferred for $R^{40}$, $R^{41}$ and $R^{42}$ are hydrogen and a methyl group.

The letter "p" is an integer of greater than 1, usually from 1 to 100, preferably from 2 to 50 and more preferably from 2 to 30.

The letter "q" indicates the number of connecting group "L" and is an integer from 2 to 4.

Connecting group "L" is a divalent, trivalent or quatravalent hydrocarbon group having 1–30, preferably 1–20 carbon atoms.

Such divalent hydrocarbon groups may be alkylene, arylene, arylalkylene, alkylarylene and hydrocarbon groups having those groups as the base skeleton. Specific examples of such hydrocarbon groups are those represented by the following formulae

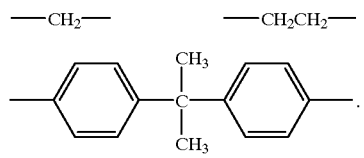

Such trivalent hydrocarbon groups may be alkyltryl, aryltryl, arylalkyltryl, alkylaryltryl and hydrocarbon groups having those groups as the base skeleton. Specific examples of such hydrocarbon groups are those represented by the following formulae:

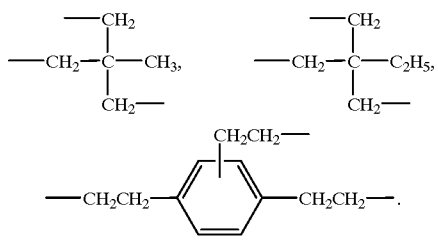

Such quatravalent hydrocarbon groups may be alkyltetraryl, aryltetraryl, arylalkyltetraryl, alkylaryltetraryl and hydrocarbon groups having those groups as the base skeleton. Specific examples of such hydrocarbon groups are those represented by the following formulae:

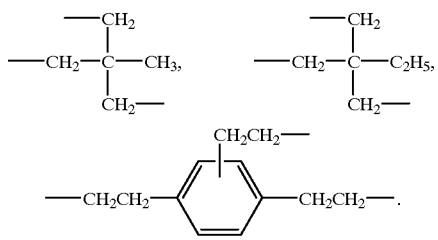

Specific examples of compounds of formula (26) are those having 1–100, preferably 2–50, more preferably 1–20 of an oxyalkylene units such as trimethylolpropanetri (polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra(polyethylene glycol methaacrylate), tetramethylolmethanetetra(polypropylene glycol acrylate), tetramethylolmethanetetra(polypropylene glycol methaacrylate) 2,2-bis[4-(acryloxypolyethoxy) phenyl]propane, 2,2-bis[4-(methaacryloxypolyethoxy) phenyl]propane, 2,2-bis[4-(acryloxypolyisopropoxy) phenyl]propane, 2,2-bis[4-(methaacryloxypolyisopropoxy) phenyl]propane and mixtures thereof.

If p is more than 2, compounds of formula (26) may be those having different oxyalkylene units, that is, polymerized oxyalkylene units having 1–50, preferably 1–20 of oxyethylene units and 1–50, preferably 1–20 oxypropylene units. Specific examples of such compounds include trimethylolpropanetri(poly(ethylene•propylene)glycol acrylate), trimethylolpropanetri(poly(ethylene•propylene) glycol methaacrylate), tetramethylolmethanetetra(poly (ethylene•propylene)glycol acrylate), tetramethylolmethanetetra(poly(ethylene•propylene)glycol acrylate) and mixtures thereof.

Needless to mention, there may be used the difunctional acryloyl-modified polyalkyleneoxide of formula (24) and the polyfunctional acryloyl-modified polyalkyleneoxide of formula (25) or (26) in combination. When these compounds are used in combination, the weight ratio of the compound of formula (24) to that of formula (25) or (26) is in the range from 0.01/99.9 to 99.9/0.01, preferably from 1/99 to 99/1 and more preferably from 20/80 to 80/20.

The above-described organic polar solvent should be added in an amount of 50–800, preferably 100–500 weight percent based on the weight of the polyfunctional acryloyl-modified polyalkyleneoxide.

The above-described supporting electrolyte should be added in an amount of 1–30, preferably 3–20 weight percent based on the total weight of the polyfunctional acryloyl-modified polyalkyleneoxide and the organic polar solvent.

If necessary, photopolymerization initiators or thermal polymerization initiators may be added to Composition (B). Although not restricted, such components may be be added in an amount of 0.005–5, preferably 0.01–3 weight percent based on the total weight of the polyfunctional acryloyl-modified polyalkylene oxide.

The following description is now made to a compound having a viologen structure contained in the ion conductive material layer of the inventive electrochromic element.

The term "a compound having a viologen structure" referred to a compound having a structure represented by the formula

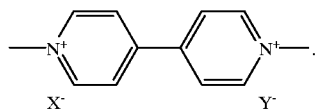

(1)

In formula (1), $X^-$ and $Y^-$ are each a counter anion and may be the same or different and an anion selected from the group consisting of a halogen anion, $ClO_4^-$, $BF_4^-$, $PF_6^-$, $CH_3COO^-$ and $CH_3(C_6H_4)SO_3^-$. The halogen anion may be $F^-$, $Cl^-$, $Br^-$ and $I^-$.

Any type of compound is eligible as the compound having a viologen structure as long as it exhibits electrochromic properties. Such a compound is exemplified by low molecular weight compounds having a plurality of viologen structures in one molecule; high molecular weight compounds having a viologen structure as a repeating unit or high molecular substituent group at the terminal ends; or high molecular weight compounds a part of which molecular chains is substituted with a group having a viologen structure.

The high molecular weight compounds having repeating units may be those of which side or main chain is formed by viologen structural units. There is no restriction to the repeating units forming the main chains of high molecular weight compounds if the side chains are formed by viologen structural units. Such repeating units forming the main chain may be hydrocarbon units, oxygen-containing units, nitrogen-containing units, polysiloxane units and copolymerized units thereof.

Specific examples of compounds having a structure represented by formula (1) are N,N'-diheptylbipyridiniumdibroimide, N,N'-diheptylbipyridiniumdichloride, N,N'-diheptylbipyridiniumdiperchlorate, N,N'-diheptylbipyridiniumtetraphloroborate, N,N'-diheptylbipyridiniumhexaphlorophosphate, N,N'-dihexylbipyridiniumdibromide, N,N'-dihexylbipyridiniumdichloride, N,N'-dihexylbipyridiniumdiperchlorate, N,N'-dihexylbipyridiniumtetraphloroborate, N,N'-dihexylbipyridiniumdihexaphlorophosphate, N,N'-dipropylbipyridiniumdibromide, N,N'-dipropylbipyridiniumdichloride, N,N'-dipropylbipyridiniumdiperchlorate, N,N'-dipropylbipyridiniumtetraphloroborate, N,N'-dipropylbipyridiniumdihexaphlorophosphate, N,N'-dibenzylbipyridiniumdibromide, N,N'-dibenzylbipyridiniumperchlorate, N,N'-dibenzylbipyridiniumtetraphloroborate, N,N'-dibenzylbipyridiniumdihexaphlorophosphate, N,N'-dimethacryloylethylbipyridiniumdibromide, N,N'-dimethacryloylethylbipyridiniumdichloride, N,N'-dimethacryloylethylbipyridiniumdiperchlorate, N,N'-dimethacryloylethylbipyridiniumditetraphloroborate, N,N'-dimethacryloylethylbipyridiniumdihexaphlorophosphate, N,N'-diacryloylethylbipyridiniumdibromide, N,N'-diacryloylethylbipyridiniumdichloride, N,N'-diacryloylethylbipyridiniumdiperchlorate, N,N'-diacryloylethylbipyridiniumditetraphloroborate, N,N'-diacryloylethylbipyridiniumdihexaphlorophosphate, N,N'-dimethacryloylmethylbipyridiniumdibromide, N,N'-dimethacryloylmethylbipyridiniumdichloride, N,N'-dimethacryloylmethylbipyridiniumdiperchlorate, N,N'-dimethacryloylmethylbipyridiniumdltetraphloroborate, N,N'-dimethacryloylmethylbipyridiniumdihexaphlorophosphate, N,N'-diacryloylmethylbipyridiniumdlbromide, N,N'-diacryloylmethylbipyridiniumdiperchlorate, N,N'-diacryloylmethylbipyridiniumditetraphloroborate, N,N'-diacryloylmethylbipyridiniumdihexaphlorophosphate, N-heptyl-N'-methacryloylethylbipyridiniumdibromide, N-heptyl-N'-methacryloylethylbipyridiniumdichlorde, N,N-heptyl-N'-methacryloylethylbipyridiniumdiperhlorate, N-heptyl-N'-methacryloylethylbipyridiniumditetraphloroborate, N-heptyl-N'-methacryloylethylbipyridiniumdihexaphlorophosphate, N-heptyl-N'-methacryloylethylbipyridiniumdlbromide, N-hexyl-N'-methacryloylethylbipyridiniumdichloride, N-hexyl-N'-methacryloylethylbipyridiniumdiperchlorate, N-hexyl-N'-methacryloylethylbipyridiniumditetraphloroborate, N-hexyl-N'-methacryloylethylbipyridiniumdihexaphlorophosphate , N-benzyl-N'-methacryloylethylbipyridiniumdibromide, N-benzyl-N'-methacryloylethylbipyridiniumdichloride, N-benzyl-N'-methacryloylethylbipyridiniumdiperchlorate, N-benzyl-N'-methacryloylethylbipyridiniumditetraphloroborate, N-benzyl-N'-methacryloylethylbipyridiniumdihexaphrolophosphate, N-butyl-N'-methacryloylethylbipyridiniumdibromide, N-butyl-N'-methacryloylethylbipyridiniumdichloride, N-butyl-N'-methacryloylethylbipyridiniumdiperchlorate, N-butyl-N'-methacryloylethylbipyridiniumditetraphloroborate, N-butyl-N'-methacryloylethylbipyridiniumdihexaphrolophosphate, N-propyl-N'-methacryloylethylbipyridiniumdlbromide, N-propyl-N'-methacryloylethylbipyridiniumdichoride, N-propyl-N'-methacryloylethylbipyridiniumdiperchlorate, N-propyl-N'-methacryloylethylbipyridiniumditetraphloroborate, N-propyl-N'-ethacryloylethylbipyridiniumdihexaphlorophosphate, N-heptyl-N'-methacryloylmethylbipyridiniumdibromide, N-heptyl-N'-methacryloylmethylbipyridiniumdichloride, N-heptyl-N'-methacryloylmethylbipyridiniumdiperchlorate, N-heptyl-N'-methacryloylmethylbipyridiniumditetraphloroborate, N-heptyl-N'-methacryloylmethylbipyridiniumdihexaphlorophosphate, N-heptyl-N'-methacryloylmethylbipyridiniumdibromide, N-hexyl-N'-methacryloylmethylbipyridiniumdichloride, N-hexyl-N'-methacryloylmethylbipyridiniumdiperchlorate, N-hexyl-N'-methacryloylmethylbipyridiniumditetraphloroborate, N-hexyl-N'-methacryloylmethylbipyridiniumdihexaphrolophosphate, N-benzyl-N'-methacryloylmethylbipyridiniumdibromide, N-benzyl N'-methacryloylmethylbipyridiniumdichloride, N-benzyl-N'-methacryloylmethylbipyridiniumdiperchlorate, N-benzyl-N'-methacryloylmethylbipyridiniumditetraphroloborate, N-benzyl-N'-methacryloylmethylbipyridiniumdihexaphlorophosphate, N-butyl-N'-methacryloylmethylbipyridiniumdibromide, N-butyl-N'-methacryloylmethylbipyridiniumdichloride, N-butyl-N'-methacryloylmethylbipyridiniumdiperchlorate, N-butyl-N'-methacryloylmethylbipyridiniumditetraphloroborate, N-butyl-N'-methacryloylmethylbipyridiniumdihexaphlorophosphate, N-propyl-N'-methacryloylmethylbipyridiniumdibromide, N-propyl-N'-methacryloylmethylbipyridiniumdichloride, N-propyl-N'-methacryloylmethylbipyridiniumdipechlorate, N-propyl-N'-methacryloylmethylbipyridiniumditetraphloroborate, N-propyl-N'-methacryloylmethylbipyridiniumdihexaphlorophosphate, N-heptyl-N'-methacryloylphenylbipyridiniumdibromide, N-heptyl-N'-methacryloylphenylbipyridiniumdichloride, N-heptyl-N'-methacryloylphenylbipyridiniumdiperchlorate, N-heptyl-N'-methacryloylphenylbipyridiniumditetraphloroborate, N-heptyl-N'-methacryloylphenylbipyridiniumdihexaphlorophosphate, N-heptyl-N'-methacryloylphenylbipyrdiniumdibromide, N-hexyl-N'-methacryloylphenylbipyridiniumdichloride, N-hexyl-N'-methacryloylphenylbipyridiniumdiperchlorate, N-hexyl-N'-methacryloylphenylbipyridiniumditetraphloroborate, N-hexyl-N'-methacryloylphenylbipyridiniumdihexaphlorophosphate, N-benzyl-N'-methacryloylphenylbipyridiniumdibromide, N-benzyl-N'-methacryloylphenylbipyridiniumdichloride, N-benzyl-N'-methacryloylphenylbipyridiniumdiperchlorate, N-benzyl-N'-methacryloylphenylbipyridiniumditetraphloroborate, N-benzyl-N'-methacryloylphenylbipyridiniumdihexaphlorophosphate, N-butyl-N'-methacryloylphenylbipyridiniumdibromide, N-butyl-N'-methacryloylphenylbipyridiniumdichloride, N-butyl-N'-methacryloylphenylbipyridiniumdiperchlorate, N-butyl-N'-methacryloylphenylbipyridiniumditetraphloroborate, N-butyl-N'-methacryloylphenylbipyridiniumdihexaphlorophosphate, N-propyl-N'-methacryloylphenylbipyridiniumdibromide, N-propyl-N'-methacryloylphenylbipyridiniumdichloride, N-propyl-N'-methacryloylphenylbipyridiniumdiperchlorate, N-propyl-N'-methacryloylphenylbipyridiniumditetraphloroborate and N-propyl-N'-methacryloylphenylbipyridiniumdihexaphlorophosphate.

Preferred compounds having a viologen structure other than the above-exemplified compounds are polymers or copolymers represented by the formula

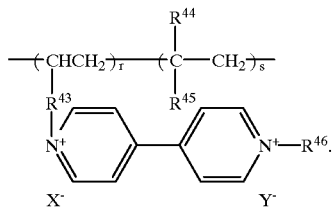

(27)

In formula (27), the letter "r" indicates an integer of more than 1, preferably from 1 to 1,000, and the letter "s" indicates an integer of more than 0, preferably from 0 to 1,000. $R^{43}$ is a $C_1$–$C_{20}$, preferably $C_1$–$C_{12}$ divalent hydrocarbon residue or merely indicates the direct bond of the viologen group to a polymer chain not through the hydrocarbon residue, namely covalently bond. Specific examples of hydrocarbon groups include aliphatic hydrocarbon groups such as methylene, ethylene, propylene, tetramethylene, pentamethylene and hexamethylene and aromatic hydrocarbon groups such as phenylene, biphenylene and benzylidene. Specific examples of oxygen-containing hydrocarbon groups include aliphatic alkoxylene groups such as —$OCH_2$——$OCH_2CH_2$— and —$OCH_2CH_2CH_2$-, aliphatic dialkoxylene groups such as —$OCH_2CH_2O$— and —$OCH_2CH_2CH_2O$—, aromatic aryloxy groups such as —$O(C_6H_4)$— and —$OCH_2(C_6H_4)$— and aromatic diaryloxy groups such as —$O(C_6H_4)O$ and —$OCH_2(C_6H_4)O$—.

$X^-$ and $Y^-$ each indicate a counter anion which is a monovalent anion, with respect to viologen and may be the same or different. $X^-$ and $Y^-$ may be a halogen anion such as $F^-$, $Cl^-$, $Br^-$ and $I^-$, $ClO_4^-$, $BF_4^-$, $PF_6^-$, $CH_3COO^-$ and $CH_3(C_6H_4)SO_3^-$, $R^{44}$, $R^{45}$ and $R^{46}$ are each a $C_1$–$C_{20}$, preferably $C_1$–$C_{12}$ hydrocarbon group and a hetero atom-containing substituent and a halogen atom. Preferred hydrocarbon groups for $R^{44}$, $R^{45}$ and $R^{46}$ are alkyl groups such as methyl, ethyl, propyl and hexyl and an aryl group such as phenyl, tolyl, benzyl and naphtyl. Preferred hetero atom-containing substituents are a $C_1$–$C_{20}$, preferably $C_1$–$C_{12}$ oxygen-containing hydrocarbon group, amide, amino and cyano groups. Such oxygen-containing hydrocarbon groups include an alkoxyl group such as methoxy and ethoxy an aryloxy group such as phenoxy and triloxy, a carboxyl group and a residual carboxylic acid ester.

In the case where the compound of formula (27) is a copolymer, the copolymerization pattern of the repeating units may be that of block-, random- or alternate-copolymerization.

The compound having a viologen structure may also be a polymer or copolymer represented by the formula

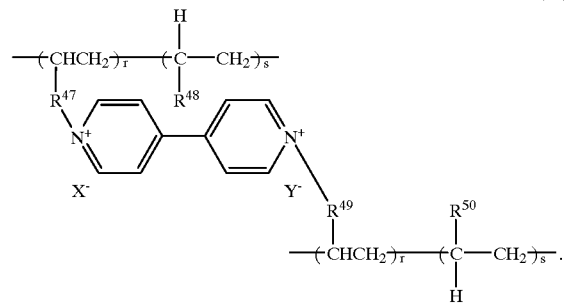

(28)

In formula (28), r, s and $X^-$ and $Y^-$ are the same as defined in formula (27) and s is preferably 0. $R^{47}$ and $R^{49}$ may be the same or different and are each the same as those as defined with respect to $R^{43}$ in formula (27) and $R^{48}$ and $R^{50}$ may the same or different and each are the same as those as defined with respect to $R^{44}$ in formula (27).

In the case where a compound of formula (28) is a copolymer, the copolymerization pattern of the repeating units may be that of block, random or alternate polymerization.

Moreover, the compound having a viologen structure may also be a polymer or copolymer represented by the formula

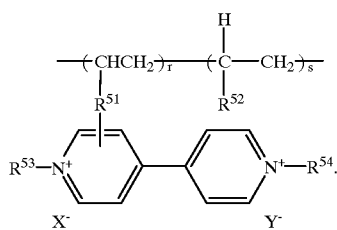

(29)

In formula (29), r, s and X⁻ and Y⁻ are the same as those as defined in formula (27) and s is preferably 0. $R^{51}$ is the same as those as defined with respect to $R^{43}$ in formula (27) and $R^{52}$, $R^{53}$ and $R^{54}$ may be the same or different and each are the same as those as defined with respect to $R^{44}$ in formula (27).

In the case where the compound of formula (29) is a copolymer, the copolymerization pattern of the repeating units may be that of block, random or alternate of polymerization.

Furthermore, the compound having a viologen structure may be a copolymer represented by the formula

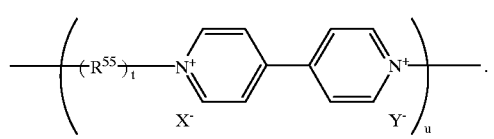

(30)

In formula (30), t is an integer of more than 0, preferably from 0 to 20, q is an integer of 0–1,000 and $R^{55}$ is the same as those as defined with respect to $R^{43}$ in formula (27).

Further alternatively, the compound having a viologen structure may also be a polymer or copolymer of the formula (31)

In formula (31), R is a $C_1$–$C_{10}$ alkyl group, v is an integer of more than 1, preferably from 1 to 1,000, $R^{56}$ is the same as those as defined with respect to $R^{44}$ in formula (27) and $R^{57}$ is the same as those as defined with respect to $R^{46}$ in formula (27).

Typical examples of the compound having a viologen structure used for the present invention have been exemplified by compounds of formulae (21) through (25). Specific examples of compounds which are included within the range of these formulae and which are not included within the range of these formulae but eligible for the invention are given below. "Pr" in the following formulae indicates a propyl group and r and s are as defined in formula (27).

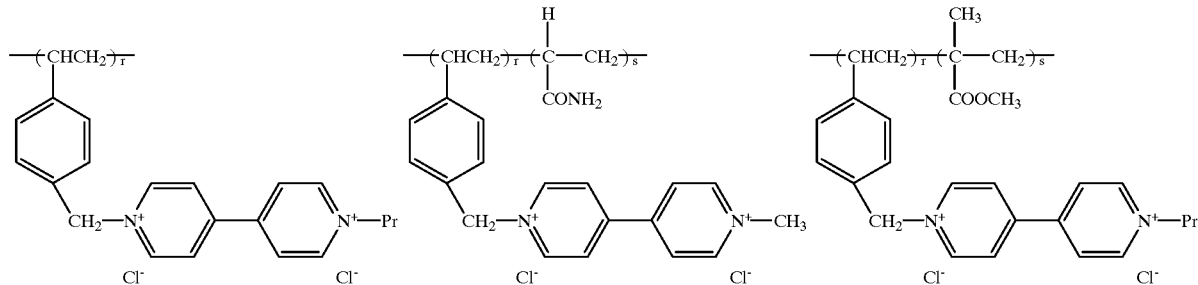

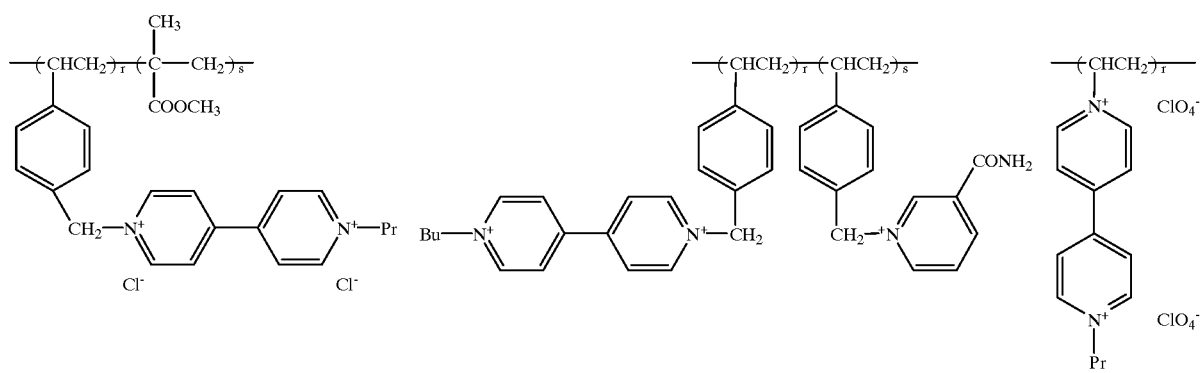

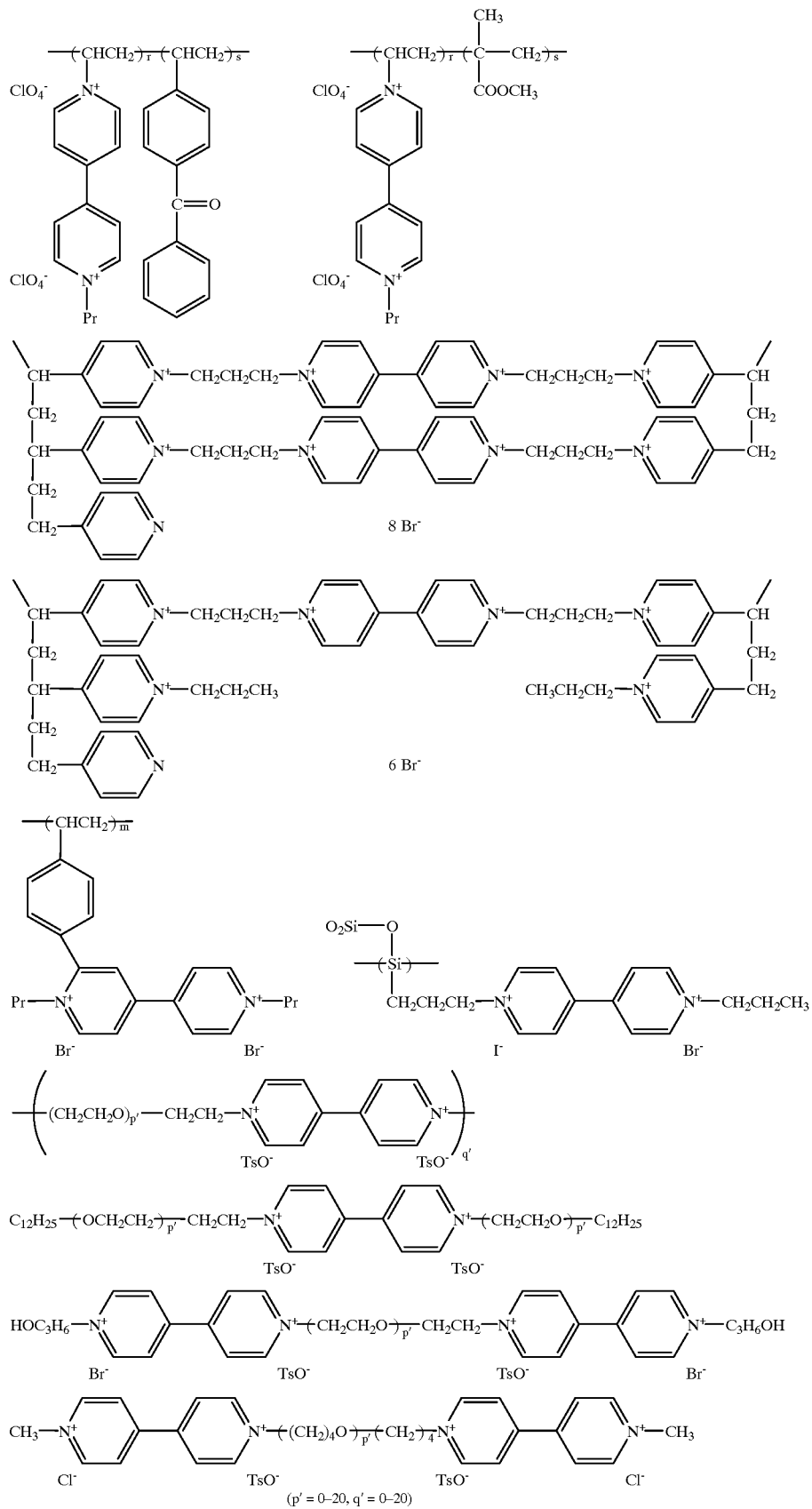

The ion conductive material of the inventive electrochromic element is formed from a liquid, gel or solid ion conductive material in which the viologen structure compound is dispersed. No particular limitation is imposed on the amount of the compound having a viologen structure. The ion conductive material contains the compound having a viologen structure in an amount from 0.0001 to 50 percent by weight, preferably 0.0001 to 30 percent by weight and more preferably 0.001 to 10 percent by weight. If necessary, the ion conductive material layer may be doped with a compound facilitating ion coloration.

The ion conductive material layer is formed between two electrically conductive substrates hereinafter referred to as counter-conductive substrates. Any suitable method can be employed for forming the ion conductive material layer. When a liquid or gelatinized ion conductive material is used, a predetermined amount of the viologen-structure compound is dispersed therein beforehand. The ion conductive material is then injected into the space provided between the substrates which are placed, facing each other and then sealed at the edges of the opposed surfaces, by vacuum injection, atmospheric injection or a meniscus method. Alternatively, the ion conductive material layer can be formed on the electrode layer of one of the electrically conductive substrates by sputtering, evaporation or a sol-gel method and then put together with the other electrically conductive substrate. Furthermore, a film-like ion conductive material is inserted between a pair of glasses to form a laminated glass.

When a solid ion conductive material, particularly the above-described Composition A or B is used, a method can be employed in which the composition in an unsolidified state is inserted into the space between the counter conductive substrates with their peripheral edges being sealed, by vacuum injection, atmospheric injection or a meniscus method and is cured in a suitable manner. The term "cure" used herein designates a state where polymerizing or crosslinking component is cured with the progress of polymerization (polycondensation) or crosslinking and thus the composition does not flow at room temperature. The composition thus cured has the basic structure in the form of network.

The structure of an electrochromic element according to the present invention is now described taken in connection with the accompanying drawings.

Figure 1:
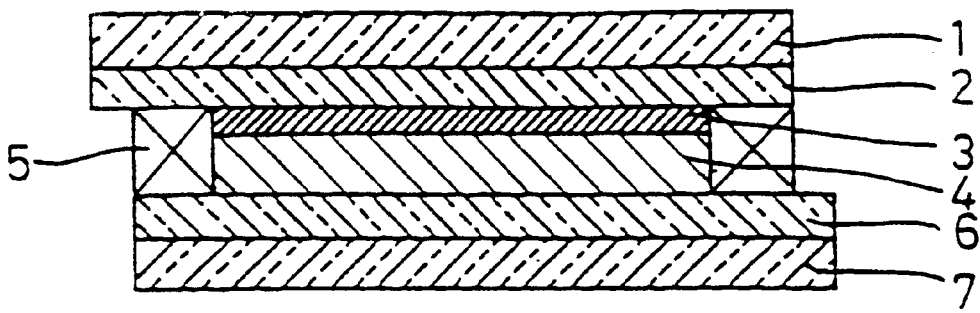
FIG. 1 is a cross-sectional view of an electrochromic element according to the invention.

The electrochromic mirror shown in FIG. 1 is constituted by a first substrate consisting of a transparent substrate (1), a transparent electrode layer (2) formed on one surface of the substrate (1) and an electrochromic layer (3) formed on the electrode layer (2); a second substrate consisting of a transparent substrate (6) and a transparent electrode layer (7) formed thereon; and an ion conductive layer (4) sandwiched in the space properly provided between the first and second substrates which are placed so that the electrochromic layer (3) and the transparent electrode layer (6) face toward the inside.

The electrochromic element in FIG. 1 is produced by the following procedures. The transparent electrode layer (2) is formed on the transparent substrate (1) and then the electrochromic layer (3) is formed on the electrode layer (2) thus formed thereby obtaining a first substrate. Separately from this, a second substrate is obtained by forming a transparent electrode layer (6) on a transparent substrate (7). The first and second substrates are opposed such that the electrochromic layer (3) and the transparent electrode layer (6) face each other to be spaced 1–1,000 $\mu$m apart and sealed at their edges with a sealant (5), leaving a portion used for an inlet, thereby forming a empty cell. Subsequently, an ion conductive material having a viologen-structure compound dispersed therein, generally in a liquid state is injected through the inlet into the cell, followed by sealing the inlet thereby producing an electrochromic element.

When the two substrates are placed, facing each other, a spacer may be inserted therebetween so as to provide a space at a fixed distance apart. No particular limitation is imposed on such a spacer. There may be used a spacer in the form of beads or a sheet. The spacer may be inserted between the conductive substrates facing each other or provided by forming the protrusions of an insulate material of the electrode on an electric conductive substrate.

Alternatively, an electrochromic element may be produced by forming an ion conductive material layer (4) containing a viologen structure-containing compound with a thickness of 1 to 1,000 $\mu$m over the electrochromic layer (3) formed on the transparent electrode layer (2) of the first substrate and then laying the second substrate thereover such that the ion conductive material layer (4) contacts the transparent electrode layer (6) of the second substrate, followed by the peripheral edges with a sealant (5).

Figure 2:
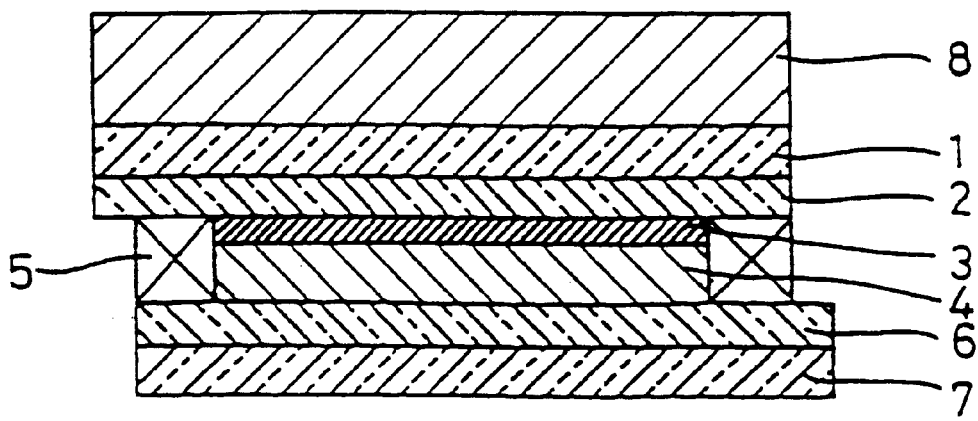
FIG. 2 is a cross-sectional view of an electrochromic mirror according to the invention.

The electrochromic mirror shown in FIG. 2 is constituted by a first substrate composed of a transparent substrate (1), an aluminum sheet placed in contacting with one surface thereof, a transparent electrode layer (2) formed on the other surface and an electrochromic layer (3) formed over the electrode layer (2); a second substrate composed of a transparent substrate (6) and a transparent electrode layer (7); and an ion conductive layer (4) sandwiched in the space properly provided between the first and second substrates which are placed so that the electrochromic layer (3) and the transparent electrode layer (6) face toward the inside.

This electrochromic mirror can be produced by the same procedures as those for the electrochromic element of FIG. 1 other than disposing the aluminum sheet in contact with one surface of the transparent substrate (1).

Although FIG. 1 shows a typical example of the structure of the inventive electrochromic element, it may be provided with an ultraviolet blocking layer such as an ultraviolet reflective layer and an ultraviolet absorbing layer, an overcoat layer arranged to protect the element entirely or the surface of each of the films or layers and a reflective plate to be used as a antiglare mirror. The ultraviolet blocking layer is preferably disposed either on the outer side of a transparent substrate (1), on a transparent electrode layer (2) thereof, on the outer side of a transparent substrate (7) or on the transparent electrode layer (6). The overcoat layer is preferably disposed on the outer side of either a transparent substrate (1) or a transparent substrate (7). The reflective plate is preferably disposed on the outer side of either a transparent substrate (1) or a transparent substrate (7). An reflective plate having conductivity can be used as an electrode layer (2) or (6).

Because the electrochromic device according to the present invention has an electrochromic layer containing specific compounds as well as an ion conductive material layer containing a compound having a viologen structure, it is quick in response and can easily be adjusted in coloration density with sufficient durability and an excellent memory function. Furthermore, the inventive electrochromic element can be easily manufactured at a relatively low cost. It is also possible to produce a large-sized electrochromic device with an enhanced safety because of capability of using a solid electrolyte as an ion conductive material layer which is free from scattering.

For the reasons described above, the electrochromic element according to the present invention is suitably applicable to light controlling windows for buildings and for vehicles such as automobiles, light controlling device for decoration and partitions and antiglare mirrors for automobiles.

The present invention will now be described in further detail with reference to Examples, which are given only by way of illustration and are not intended for limiting the invention.

EXAMPLE 1

(1) Synthesis of an Electrochromic Compound and the Film Formation Thereof 5.37 g (20 mmol) of N,N,N'-triethylbenzidine obtained by reacting benzidine and 3 equivalents of ethylchloride were dissolved in 50 ml of methylene chloride, and 20 ml of a methylene chloride solution of 2.30 g (22 mmol) of methacrylic chloride were added dropwise thereto in the presence of triethylamine. After the resulting reaction solution was mixed with water to remove the water-soluble substances and the water was removed with sodium sulfate, the solvent was distilled out thereby obtaining 6.34 g (18 mmol) of N-methacryloyl-N,N',N'-triethylbenzidine (electrochromic compound). The structure of the electrochromic compound is as follows:

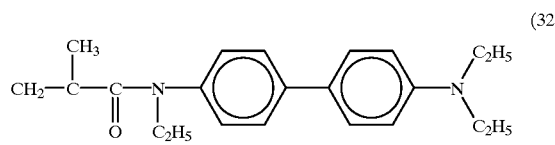

(32)

The electrochromic compound was dissolved in a chloroform solution together with 2 weight % of polymerization initiator "AIBN" so as to be 10 weight % of solution. The solution was spin-coated over an ITO transparent electrode layer formed over a glass substrate. The glass substrate was heated on a hot plate to remove the chloroform and subjected to ultraviolet ray radiation by a high-voltage mercury lump to form a cross-linked polymer film layer thereby obtaining a substrate with an electrochromic layer having a film thickness of 5 μm. The substrate is hereinafter referred to as Substrate A. The number of repeating unit corresponding to "a" in formula (2) of the polymer in this electrochromic layer was about 20.

(2) Synthesis of a Viologen Compound

In a flask, 3.12 g (20 mmol) of bipyridyl was dissolved in 100 ml acetnitrile, and 7.16 g (40 mmol) of n-heptylbromide was added thereto.

The mixture was reacted at the reflux temperature of acetnitrile for 12 hours and the precipitated solid product was filtrated and dried thereby obtaining 8.74 g (17 mmol) of N,N'-diheptylbipyridiniumdibromide.

(3) Preparation of an Electrochromic Element

An epoxy-based resin was applied in the form of lines on the edges, except a portion thereof, of the surface of an ITO transparent electrode coated over a glass substrate. This glass substrate with an ITO electrode layer is hereinafter referred to as Substrate B. Substrate A was superposed on Substrate B such that the electrochromic layer faced the ITO layer of Substrate B while being pressed so as to cure the adhesive thereby to provide an empty cell with an inlet.

On the other hand, a homogenous solution was obtained by adding 0.4 g of lithium perchlorate and 0.1 g of N,N'-diheptylbipyridiniumdibromide obtained in (2) above to a mixed solution of 1.0 g of methoxypolyethylene glycol monomethacrylate (oxyethylene unit number: 4) manufactured by SHIN NAKAMURA CHEMICAL CO., LTD. under the trade name of MEO4, 0.02 g of polyethylene glycol dimethacrylate (oxyethylene unit number: 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane- 1-on manufactured by Merk Co,. Ltd., under the name of "Darocure-1116" as a photopolymerization initiator in a dark room thereby obtaining a homogeneous solution. The resulting homogeneous solution was then injected as an electrolyte precursor into the cell obtained above through the inlet after being deaerated.

After the inlet port was sealed with an epoxy sealant, the electrolyte precursor in the cell was cured by exposing the side of Substrate B to fluorescent light so as to form a solid electrolyte thereby obtaining an all solid type electrochromic element of the structure as shown in FIG. 1.

The element when assembled was not colored and had a transmittance of about 80%. The element was quick in response to an application of an electric voltage and exhibited excellent electrochromic properties. Namely, the mirror was colored upon an application of a voltage of 1.5 V and was about 15% in a transmittance of 633 nm wavelength of light after 10 seconds.

Example 2

(1) Synthesis of an Electrochromic Compound 25.4 g (150 mmol) of diphenylamine and 22.8 g (150 mmol) of cesiumfloride were weighed into a 500 ml three-necked flask and the interior thereof was purged with nitrogen, followed by addition of 250 ml dimethylsulfoxide and stirring. The flask was charged with 21.3 gram (150 mmol) of 1-phloro-4-nitrobenzene and heated to 120° C. in an oil bath, followed by 24-hours stirring.

The resulting reaction solution was poured into ice water so as to obtain a solid precipitate. The solid product thus obtained was recrystallized from acetic acid thereby obtaining 29.5 g (102 mmol) of a compound represented by the formula

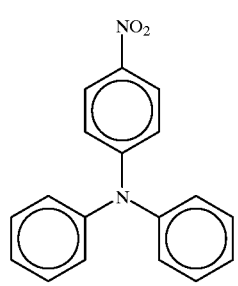

(33)

15.0 g (52 mmol) of the above compound were transferred to a 500 ml three-necked flask, and 200 ml of dimethylfromamide and 1.5 g of 5% palladium/carbon were added thereto, followed by feeding hydrogen at atmospheric pressure. After 12-hours stirring at room temperature, the palladium carbon was filtrated, and the reaction solution was poured into ice water so as to obtain a solid precipitate.

A white solid product thus obtained was vacuum-dried thereby obtaining 12.5 g (48 mmol) of a compound represented by the formula

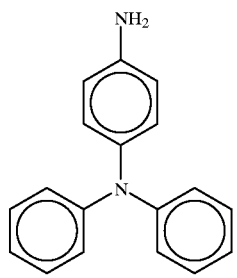

(34)

12.5-g(48 mmol) of the compound of formula (34) were transferred to a 500 ml three-necked flask, and 250 ml of benzene and 10 ml of triethylamine were added thereto. The mixture was stirred and cooled with ice. A solution of 6.3 g (60 mmol) methacrylic chloride and 20 ml benzene was further added dropwise to the mixture.

The resulting reaction solution was mixed with 1NHCl aqueous solution twice, with water twice and with 1NnaOH solution twice to remove the components which are soluble thereto and water and then mixed with sodium sulfide to remove the water. The solvent was distilled out thereby obtaining 13.4 g (41 mmol) of an electrochromic compound represented by the formula

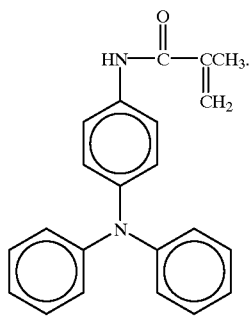

(35)

The electrochromic compound was dissolved in methylene chloride together with 2 weight % of polymerization initiator "AIBN" so as to be a 10 weight % of solution. The solution was spin-coated over an ITO transparent electrode layer formed over a glass substrate having an aluminum sheet on the other side as a reflective sheet. The glass substrate was heated on a hot plate to remove chloroform and subjected to ultraviolet ray radiation by a high-voltage mercury lump to form a cross-linked polymer film layer thereby obtaining a substrate with an electrochromic layer having a film thickness of 7 μm. The substrate is hereinafter referred to as Substrate C. The number of repeating unit corresponding to "a" in formula (2) of the polymer in this electrochromic layer was about 20.

(2) Preparation of an Antiglare Mirror

An epoxy-based resin was applied in the form of lines on the edges, except a portion thereof, of the surface of an $SnO_2$ transparent electrode coated over a glass substrate. This glass substrate with an $SnO_2$ electrode layer is hereinafter referred to as Substrate D. Substrate C was superposed on Substrate D such that the electrochromic layer faced the $SnO_2$ transparent electrode layer of Substrate D while being pressed so as to cure the adhesive thereby to provide an empty cell with an inlet.

On the other hand, a homogenous solution was obtained by adding 0.4 g of lithium perchlorate to a mixed solution of 1.0 g of methoxypolyethylene glycol monomethacrylate (oxyethylene unit number: 4) manufactured by SHIN NAKAMURA CHEMICAL CO., LTD. under the trade name of MEO4, 0.02 g of polyethylene glycol dimethacrylate (oxyethylene unit number: 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane- 1-on manufactured by Merk Co,. Ltd., under the name of "Darocure-1116" as a photopolymerization initiator in a dark room thereby obtaining a homogeneous solution. The resulting homogeneous solution was then injected as an electrolyte precursor into the cell obtained above through the inlet after being deaerated.

After the inlet port was sealed with an epoxy sealant, the electrolyte precursor in the cell was cured by exposing the side of Substrate C to fluorescent light so as to form a solid electrolyte thereby obtaining an all solid type electrochromic mirror of the structure as shown in FIG. 2.

The element when assembled was not colored and had a reflectance of about 75%. The mirror was quick in response to an application of an electric voltage and exhibited excellent electrochromic properties. The mirror was colored upon an application of a voltage of 1.5 V and had a reflectance of about 10%.

EXAMPLE 3

(1) Synthesis of an Electrochromic Compound

Into a 100 ml three-necked flask were added 1.50 g (5.20 mmol) of N,N'-dimethyl-N,N'-diphenyl-p-phenylenediamine, 0.39 g (6.8 mmol) of propionaldehyde and 30 ml of nitrobenzene. The mixture was heated at a temperature of 40° C. and stirred with a magnetic stirrer and 0.05 g (0.4 mmol) of triphloroacetate was added thereto as a catalyst. After 120 hours, the reaction solution was added dropwise to ethanol so as to obtain a precipitated polymer thereby obtaining a polymer with a weight average molecular weight of 3,500 having a structure represented by the formula

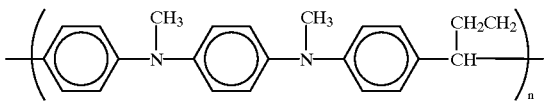

(36)

wherein "n" averages about 10.

(2) Synthesis of a Viologen Compound

In a flask, 3.12 g (20 mmol) of bipyridyl was dissolved in 100 ml acetnitrile, and 7.16 g (40 mmol) of n-heptylbromide were added thereto.

The mixture was reacted at the reflux temperature of acetnitrile for 12 hours and the precipitated solid product was filtrated and dried thereby obtaining 8.74 g (17 mmol) of N,N'-diheptylbipyridiniumdibromide.

(3) Preparation of an electrochromic element

The electrochromic compound obtained in the above (1) was dissolved in nitrobenzene so as to be 10 weight percent solution. The solution was applied over an ITO surface coated over a glass substrate. The glass substrate was then heated on a hot plate to remove nitrobenzene thereby obtaining a transparent electrically conductive substrate having an electrochromic layer with about 5 μm thickness. The substrate was hereinafter referred to as Substrate E.

An epoxy-based resin was applied in the form of lines on the edges, except a portion thereof, of the surface of an ITO transparent electrode coated over a glass substrate. This glass substrate with an ITO electrode layer is hereinafter referred to as Substrate F. Substrate E was superposed on Substrate F such that the electrochromic layer faced the ITO layer of Substrate F while being pressed so as to cure the adhesive thereby to provide an empty cell with an inlet.

On the other hand, a homogenous solution was obtained by adding 0.4 g of lithium perchlorate and 0.1 g of heptyl-viologen to a mixed solution of 1.0 g of methoxypolyethylene glycol monomethacrylate (oxyethylene unit number: 4) manufactured by SHIN NAKAMURA CHEMICAL CO., LTD. under the trade name of MEO4, 0.02 g of polyethylene glycol dimethacrylate (oxyethylene unit number: 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane- 1-on manufactured by Merk Co,. Ltd., under the name of "Darocure-1116" as a photopolymerization initiator in a dark room thereby obtaining a homogeneous solution. The resulting homogeneous solution was then injected as an electrolyte precursor into the cell obtained above through the inlet after being deaerated.

After the inlet port was sealed with an epoxy sealant, the electrolyte precursor in the cell was cured by exposing the side of Substrate F to fluorescent light so as to form a solid electrolyte thereby obtaining an all solid type electrochromic element of the structure as shown in FIG. 1.

The element when assembled was not colored and had a transmittance of about 80%. The element was quick in response to an application of an electric voltage and exhibited excellent electrochromic properties. Namely, the mirror was colored upon an application of a voltage of 1.5 V and was about 10% in a transmittance 633 nm wavelength of light after 10 seconds.

EXAMPLE 4

(1) Synthesis of an Electrochromic Compound

Into a 100 ml three-necked flask were added 1.50 g (4.12 mmol) of N,N'-dimethyl-N,N'-diphenylbenzidine, 0.42 g (5.8 mmol) of methylethylketone and 30 ml of nitrobenzene. The mixture was heated at a temperature of 60° C. and stirred with a magnetic stirrer at the same time and 0.05 g (0.5 mmol) of sulfuric acid was added thereto as a catalyst. After 140 hours, the reaction solution was added dropwise to ethanol so as to obtain a precipitated polymer thereby obtaining a polymer with a weight average molecular weight of 4,000 having a structure represented by the formula of N-heptylbipyridiniumchloride thus obtained were dissolved in 150 ml of methanol and 11.39 (21 mmol) of 2-bromomethylmethacrylate were added thereto, followed by 24 -hours-stirring at room temperature thereby obtaining N-hpetyl-N'-methacrylethylbipyridiniumbromide.

(3) Preparation of an Antiglare Mirror

The electrochromic compound obtained in the above (1) was dissolved in nitrobenzene so as to be 10 weight percent solution. The solution was applied over an $SnO_2$ transparent electrode surface coated over a glass substrate having an aluminum reflective sheet on the other surface. The glass substrate was then heated on a hot plate to remove nitrobenzene thereby obtaining a reflective transparent electrically conductive substrate having an electrochromic layer with about 5 μm thickness. The substrate was hereinafter referred to as Substrate G.

An epoxy-based resin was applied in the form of lines on the edges , except a portion thereof, of the surface of an $SnO_2$ transparent electrode coated over a glass substrate. This glass substrate with an $SnO_2$ electrode layer is hereinafter referred to as Substrate H. Substrate G was superposed on Substrate H such that the electrochromic layer faced the $SnO_2$ transparent electrode layer of Substrate D while being pressed so as to cure the adhesive thereby to provide an empty cell with an inlet.

On the other hand, a homogenous solution was obtained by adding 0.4 g of lithium perchlorate to a mixed solution of 1.0 g of methoxypolyethylene glycol monomethacrylate (oxyethylene unit number: 4) manufactured by SHIN NAKAMURA CHEMICAL CO., LTD. under the trade name of MEO4, 0.02 g of polyethylene glycol dimethacrylate (oxyethylene unit number : 9) manufactured by SHIN NAKAMURA CHEMICAL CO., LTD. under the trade name of 9G and 4.0 g of γ-butylolactone. To the homogenous solution was added 0.02 g of 1-(4-isopropylphenyl)-2-hydroxy-2-methylpropane- 1-on manufactured by Merk Co,. Ltd., under the name of "Darocure-1116" as a photopolymerization initiator and 0.1 g of N-heptyl-N'-methacrylethylbipyridiniumdibromide in a dark room thereby obtaining a homogeneous solution. The resulting homogeneous solution was then injected as an electrolyte precursor into the cell obtained above through the inlet after being deaerated.

After the inlet port was sealed with an epoxy sealant, the electrolyte precursor in the cell was cured by exposing the side of Substrate G to fluorescent light so as to form a solid electrolyte thereby obtaining an all solid type electrochromic mirror of the structure as shown in FIG. 2.

The element when assembled was not colored and had a reflectance of about 75%. The mirror was quick in response to an application of an electric voltage and exhibited excellent electrochromic properties. The mirror was colored upon an application of a voltage of 1.5 V and had a reflectance of about 10%.

(37)

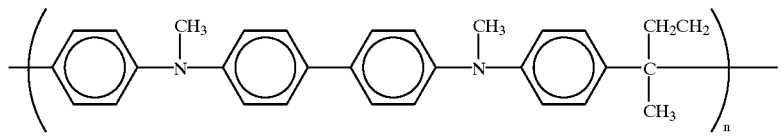

wherein "n" averages about 10 in average.

(2) Synthesis of a viologen compound

In methanol, bipyridyl and heptylchloride in an equimolecular amount were reacted thereby obtaining monosubstituent N-heptylbipyridiniumchloride. 7.06 g (21 mmol)

EXAMPLE 5

(1) Synthesis of an Electrochromic Compound

Into a 100 ml three-necked flask were added 3.00 g (6.02 mmol) of N,N'-dimethyl-N,N'-di(N-methyl-N-phenyl-p-anilino)-phenyl-p-phenylenediamine, 0.83 g (7.8 mmol) of benzaldehyde and 30 ml of nitrobenzene. The mixture was heated at a temperature of 60° C. and stirred with a magnetic stirrer at the same time and 0.05 g (0.5 mmol) of sulfuric acid was added thereto as a catalyst. After 150 hours, the reaction solution was added dropwise to ethanol so as to obtain a precipitated polymer thereby obtaining a polymer with a weight average molecular weight of 3,000 having a structure represented by the formula

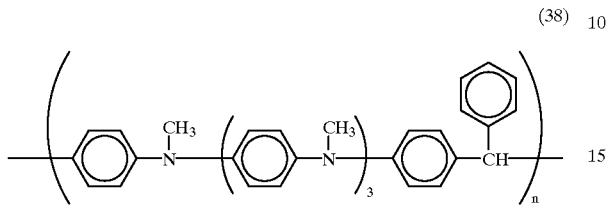

(38)

wherein "n" averages about 5.

(2) Preparation of an Electrochromic Element

The electrochromic compound obtained in the above (1) was dissolved in nitrobenzene so as to be 10 weight percent solution. The solution was applied over an $SnO_2$ surface coated over a glass substrate. The glass substrate was then heated on a hot plate to remove nitrobenzene thereby obtaining a transparent electrically conductive substrate having an electrochromic layer. The substrate was hereinafter referred to as Substrate I.

An epoxy-based resin was applied in the form of lines on the edges, except a portion thereof, of the surface of an $SnO_2$ transparent electrode coated over a glass substrate. This glass substrate with an $SnO_2$ electrode layer is hereinafter referred to as Substrate J. Substrate I was superposed on Substrate J such that the electrochromic layer faced the $SnO_2$ layer of Substrate J while being pressed so as to cure the adhesive thereby to provide an empty cell with an inlet.

On, the other hand, a homogenous solution was obtained by adding 0.4 g of lithium perchlorate and 0.1 g of heptyl-viologen to a mixed solution of 1.0 g of methoxypolyethylene glycol monomethacrylate (oxyethylene unit number: 9) manufactured by SHIN NAKAMURA CHEMICAL CO., LTD. under the trade name of ME09, 0;02 g of polyethylene glycol dimethacrylate (oxyethylene unit number: 9) manufactured by SHIN NAKAMURA CHEMICAL CO., LTD. under the trade name of 9G and 4.0 g of y -butylolactone. To the homogenous solution was added 0.02 g of 1-(4-isopropylphenyl)-2-hydroxy-2-methylpropane- 1-on manufactured by Merk Co,. Ltd., under the name of "Darocure-1116" as a photopolymerization initiator in a dark room thereby obtaining a homogeneous solution. The resulting homogeneous solution was then injected as an electrolyte precursor into the cell obtained above through the inlet after being deaerated.

After the inlet port was sealed with an epoxy sealant, the electrolyte precursor in the cell was cured by exposing the side of Substrate J to fluorescent light so as to form a solid electrolyte thereby obtaining an all solid type electrochromic element of the structure as shown in FIG. 1.

The element when assembled was not colored and had a transmittance of about 70%. The element was quick in response to an application of an electric voltage and exhibited excellent electrochromic properties. The element was colored upon an application of a voltage of 1.5 V and was about 10% in transmittance.

What is claimed is:

1. An electrochromic element comprising two conductive substrates, at least one of which is transparent; an ion conductive layer disposed therebetween and containing a compound having a viologen structure represented by formula (1) below; and an electrochromic layer disposed between the ion conductive layer and at least either one of the two conductive substrates and containing a compound represented by formula (2) or (3) below; formula (1) being represented by

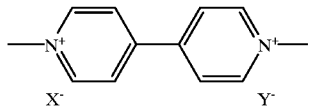

(1)

wherein $X^-$ and $Y^-$ may be the same or different and each are a counter anion selected from the group consisting of a halogen anion, $ClO_4^-$, $BF_4^-$, $PF_6^-$, $CH_3COO^-$ and $CH_3(C_6H_4)SO_3^-$; formula (2) being represented by

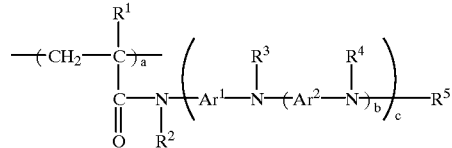

(2)

wherein $R^1$ is hydrogen or an alkyl group having 1 to 5 carbon atoms, $R^2$, $R^3$, $R^4$ and $R^5$ are each independently a hydrocarbon group or hydrocarbon residue having 1 to 20 carbon atoms and may be the same or different from each other, $Ar^1$ and $Ar^2$ are each independently a divalent aromatic hydrocarbon residue having 6 to 20 carbon atoms, a is an integer greater than 2 and b and c are each an integer of 0 to 3; and formula (3) being represented by

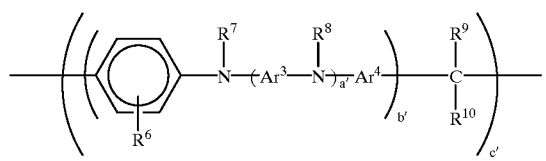

(3)

wherein $R^6$, $R^7$, $R^8$, $R^9$ and $R^{10}$ are each independently hydrogen or a hydrocarbon group residue having 1 to 20 carbon atoms, $Ar^4$ and $Ar^5$ are each independently a divalent aromatic hydrocarbon residue, a' is an integer of 0 to 3, b' is an integer of 1 or 2 and c' is an integer greater than 2.

2. The electrochromic element according to claim 1 wherein said electrochromic layer is composed of a polymer represented by the formula

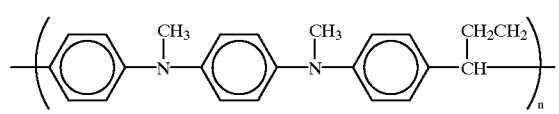

(36)

wherein n averages about 10.

3. The electrochromic element according to claim 1 wherein said electrochromic layer is composed of a polymer with a weight average molecular weight of 4,000, represented by the formula

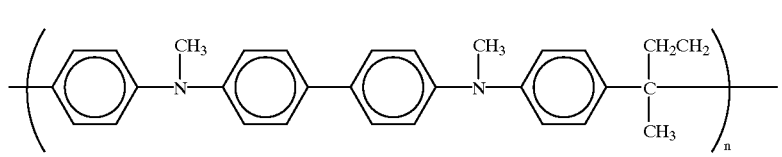
(37)

wherein n averages about 10.

4. The electrochromic element according to claim 1 wherein said electrochromic layer is composed of a polymer with a weight average molecular weight of 3,000, represented by the formula

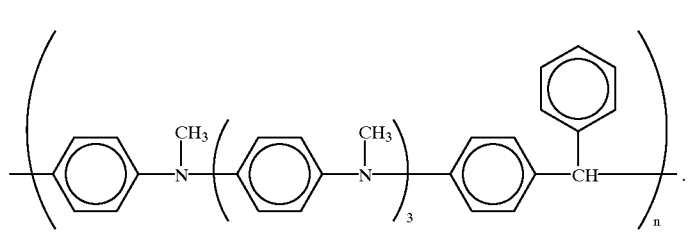
(38)

5. The electrochromic element according to claim 1 wherein said ion conductive material layer is composed of a mixture obtained by a compound having a viologen structure to a composition a polar solvent, a supporting electrolyte and an urethaneacrylate represented by the formula

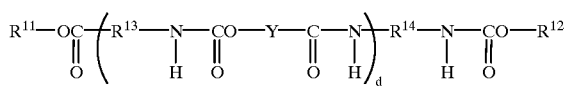
(9)

wherein $R^{11}$ and $R^{12}$ is the same or different and are each a group of formula (10), (11) or (12) below, $R^{13}$ and $R^{14}$ is the same or different and are each a $C_1$–$C_{20}$, preferably $C_2$–$C_{12}$ divalent hydrocarbon residue, Y is selected from a polyether unit, a polyester unit, a polycarbonate unit and the mixed unit thereof and n is an integer from 1 to 100, preferably 1 to 50 and more preferably 1 to 20, and formulae (10), (11) and (12) are represented by the formulae, respectively

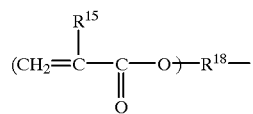
(10)

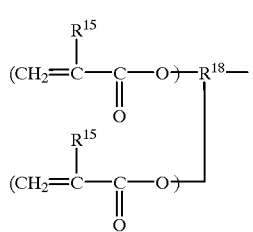
(11)

(12)

-continued

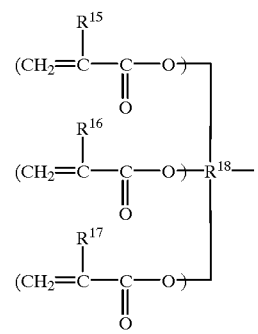

wherein $R^{15}$, $R^{16}$ and $R^{17}$ are the same or different and are hydrogen or a $C_1$–$C_3$ alkyl group and $R^{18}$ is a $C_1$–$C_{20}$, preferably $C_2$–$C_8$ organic residue of divalent through quatervalent.

6. The electrochromic element according to claim 1 wherein said ion conductive material layer is composed of a mixture obtained by adding a compound having a viologen structure to a composition a polar solvent, a supporting electrolyte and an acryloyle-modified polyalkylene oxide of formula either one of (24), (25) or (26):

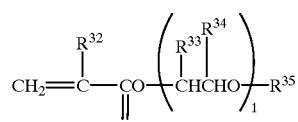
(24)

wherein $R^{32}$, $R^{33}$, $R^{34}$ and $R^{35}$ are each hydrogen and a $C_1$–$C_5$ alkyl group and "l" is an integer of greater than 1;

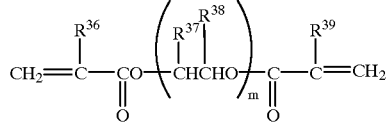 (25)

wherein $R^{36}$, $R^{37}$, $R^{38}$ and $R^{39}$ are each hydrogen and a $C_1$–$C_5$ alkyl group and m is an integer of greater than 1;

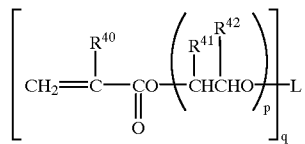 (26)

wherein $R^{40}$, $R^{41}$ and $R^{42}$ are each hydrogen and a $C_1$–$C_5$ alkyl group, p is an integer of greater than 1, q is an integer from 2 to 4 and L is a connecting group of valence indicated by q.

* * * * *